US007154951B2

(12) United States Patent
Wang

(10) Patent No.: US 7,154,951 B2
(45) Date of Patent: Dec. 26, 2006

(54) MOTION VIDEO SIGNAL ENCODER AND ENCODING METHOD

(75) Inventor: Albert S. Wang, Palo Alto, CA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 10/803,070

(22) Filed: Mar. 16, 2004

(65) Prior Publication Data

US 2004/0184535 A1 Sep. 23, 2004

Related U.S. Application Data

(60) Continuation of application No. 09/653,124, filed on Aug. 31, 2000, now Pat. No. 6,707,852, which is a division of application No. 08/841,838, filed on May 5, 1997, now Pat. No. 6,115,420, which is a continuation-in-part of application No. 08/819,507, filed on Mar. 14, 1997, now Pat. No. 6,118,817.

(51) Int. Cl.
  *H04B 1/66* (2006.01)
  *H04N 7/12* (2006.01)
(52) U.S. Cl. ............................................. 375/240.12
(58) Field of Classification Search .......... 375/240.12, 375/240.02, 240.03, 240.05, 240.22; 348/405.1, 348/407.1, 409.1, 411.1, 412.1, 415.1, 439.1, 348/384, 390, 400.1, 401.1, 416.1, 419.1; 382/232, 236, 238, 251; *H04N 7/12*
See application file for complete search history.

(56) References Cited

U.S. PATENT DOCUMENTS

| 4,259,740 | A | | 3/1981 | Snell et al. |
| 4,394,774 | A | * | 7/1983 | Widergren et al. ......... 382/250 |
| 4,816,914 | A | | 3/1989 | Ericsson |
| 4,862,264 | A | | 8/1989 | Wells et al. |
| 5,050,161 | A | | 9/1991 | Golestani |
| 5,088,107 | A | | 2/1992 | Piasecki et al. |
| 5,144,425 | A | | 9/1992 | Joseph |
| 5,247,355 | A | | 9/1993 | Frederiksen |
| 5,313,454 | A | | 5/1994 | Bustini et al. |
| 5,351,095 | A | | 9/1994 | Kerdranvat |

(Continued)

OTHER PUBLICATIONS

"Video Coding for Low Bitrate Communication", ITU-T, Draft H.263: Line Transmission of Non-Telephone Signals, Int'l Telecommunication Union, (May 2, 1996).

(Continued)

*Primary Examiner*—Nhon Diep
(74) *Attorney, Agent, or Firm*—Lee & Hayes, PLLC

(57) ABSTRACT

A motion video signal encoder maximizes image quality without exceeding transmission bandwidth available to carry the encoded motion video signal by comparing encoded frames of the motion video signal to a desired size of frame. If the size of encoded frames differ from the desired size, encoding is adjusted to produce encoded frames closer in size to the desired size. In addition, a cumulative bandwidth error records an accumulated amount of available bandwidth. The cumulative bandwidth error is adjusted as time elapses to add to the available bandwidth and as each frame is encoded to thereby consume bandwidth. As the cumulative bandwidth error grows in magnitude above or below zero, encoding is adjusted as needed to either improve image quality to more completely consume available bandwidth or to reduce image quality to thereby consume less bandwidth and to thereby cause the cumulative bandwidth error to move toward zero. Rapid changes in the amount of change or motion in the motion video signal are detected by comparing the amount of change between two consecutive frames and filtering the amount of change with previously measured amounts of change. Encoding is precompensated according to the filtered measurement of rapid change.

16 Claims, 11 Drawing Sheets

U.S. PATENT DOCUMENTS

| | | | |
|---|---|---|---|
| 5,414,469 A | 5/1995 | Gonzales et al. | |
| 5,434,848 A | 7/1995 | Chimento, Jr. et al. | |
| 5,453,801 A | 9/1995 | Kim | |
| 5,467,413 A | 11/1995 | Barrett | |
| 5,473,379 A | 12/1995 | Horne | |
| RE35,158 E | 2/1996 | Sugiyama | |
| 5,490,252 A | 2/1996 | Macera et al. | |
| 5,502,492 A | 3/1996 | Jung | |
| 5,504,744 A | 4/1996 | Adams et al. | |
| 5,512,952 A | 4/1996 | Iwamura | |
| 5,519,701 A | 5/1996 | Colmant et al. | |
| 5,533,021 A | 7/1996 | Branstad et al. | |
| 5,537,155 A | 7/1996 | O'Connell et al. | |
| 5,537,408 A | 7/1996 | Branstad et al. | |
| 5,557,341 A | 9/1996 | Weiss et al. | |
| 5,566,175 A | 10/1996 | Davis | |
| 5,574,724 A | 11/1996 | Bales et al. | |
| 5,576,767 A | 11/1996 | Lee et al. | |
| 5,583,980 A | 12/1996 | Anderson | |
| 5,600,775 A | 2/1997 | King et al. | |
| 5,606,373 A | 2/1997 | Dopp et al. | |
| 5,621,660 A | 4/1997 | Chaddha et al. | |
| 5,623,312 A | 4/1997 | Yan et al. | |
| 5,623,313 A | 4/1997 | Naveen | |
| 5,623,690 A | 4/1997 | Palmer et al. | |
| 5,663,810 A | 9/1997 | Kirk | |
| 5,699,484 A | 12/1997 | Davis | |
| 5,729,295 A | 3/1998 | Okada | |
| 5,734,419 A | 3/1998 | Botsford, III et al. | |
| 5,751,378 A | 5/1998 | Chen et al. | |
| 5,784,115 A | 7/1998 | Bozdagi | |
| 5,815,217 A * | 9/1998 | Kumazawa et al. | 348/700 |
| 5,825,473 A | 10/1998 | Kodaira | |
| 5,835,163 A | 11/1998 | Liou et al. | |
| 5,859,667 A | 1/1999 | Kondo et al. | |
| 5,875,003 A | 2/1999 | Kato et al. | |
| 5,892,535 A | 4/1999 | Allen et al. | |
| 5,929,916 A * | 7/1999 | Legall et al. | 375/240.05 |
| 5,936,940 A * | 8/1999 | Marin et al. | 370/232 |
| 5,978,544 A | 11/1999 | Shimada et al. | |
| 6,011,589 A | 1/2000 | Matsuura et al. | |
| 6,055,025 A | 4/2000 | Shahraray | |
| 6,081,551 A | 6/2000 | Etoh | |
| 6,115,420 A | 9/2000 | Wang | |
| 6,163,574 A | 12/2000 | Yagasaki | |
| 6,335,990 B1 | 1/2002 | Chen et al. | |
| 6,456,648 B1 * | 9/2002 | Bultan et al. | 375/148 |
| 6,480,670 B1 | 11/2002 | Hatano et al. | |
| 6,678,324 B1 | 1/2004 | Yamauchi | |
| 6,833,846 B1 * | 12/2004 | Hasser | 715/701 |

OTHER PUBLICATIONS

Chaddha, N., et al., "An end to end software only scalable video delivery system", Proceedings Networks and Operating System Support for Digital Audio and Video, pp. 130-141, (Apr. 21, 1995).

Chaddha, N., et al., "Hierarchical Vector Quantization of Perceptually Weighted Block Transforms", IEEE, pp. 3-12, (1995).

Linde, Y., et al., "An Algorithm for Vector Quantizer Design", IEEE Transactions on Communications, vol. COM-28, No. 1, pp. 84-95, (Jan. 1980).

* cited by examiner

MOTION VIDEO SIGNAL ENCODER AND ENCODING METHOD

CROSS REFERENCE TO RELATED APPLICATIONS

This is a continuation of U.S. patent application Ser. No. 09/653,124, filed Aug. 31, 2000, now U.S. Pat. No. 6,707,852, which is a divisional of U.S. patent application Ser. No. 08/841,838, filed on May 5, 1997, now U.S. Pat. No. 6,115,420, which is a continuation-in-part of U.S. patent application Ser. No. 08/819,507, filed Mar. 14, 1997, now U.S. Pat. No. 6,118,817, each of which are incorporated hereby reference.

FIELD OF THE INVENTION

The present invention relates to digital video signal compression and, in particular, to a particularly efficient signal encoding mechanism for encoding digital video signals according to digital video standards such as the ITU standard H.263.

BACKGROUND OF THE INVENTION

With the advent of digital video products and services, such as Digital Satellite Service (DSS) and storage and retrieval of video streams on the Internet and, in particular, the World Wide Web, digital video signals are becoming ever present and drawing more attention in the marketplace. Because of limitations in digital signal storage capacity and in network and broadcast bandwidth limitations, compression of digital video signals has become paramount to digital video storage and transmission. As a result, many standards for compression and encoding of digital video signals have been promulgated. For example, the International Telecommunication Union (ITU) has promulgated the H.261 and H.263 standards for digital video encoding. Additionally, the International Standards Organization (ISO) has promulgated the Motion Picture Experts Group (MPEG), MPEG-1, and MPEG-2 standards for digital video encoding.

These standards specify with particularity the form of encoded digital video signals and how such signals are to be decoded for presentation to a viewer. However, significant discretion is left as to how the digital video signals are to be transformed from a native, uncompressed format to the specified encoded format. As a result, many different digital video signal encoders currently exist and many approaches are used to encode digital video signals with varying degrees of compression achieved.

In general, greater degrees of compression are achieved at the expense of video image signal loss and higher quality motion video signals are achieved at the expense of lesser degrees of compression and thus at the expense of greater bandwidth requirements. It is particularly difficult to balance image quality with available bandwidth when delivery bandwidth is limited. Such is the case in real-time motion video signal delivery such as video telephone applications and motion video on demand delivery systems. It is generally desirable to maximize the quality of the motion video signal as encoded without exceeding the available bandwidth of the transmission medium carrying the encoded motion video signal. If the available bandwidth is exceeded, some or all of the sequence of video images are lost and, therefore, so is the integrity of the motion video signal. If an encoded motion video signal errs on the side of conserving transmission medium bandwidth, the quality of the motion video image can be compromised significantly.

The format of H.263 encoded digital video signals is known and is described more completely in "ITU-T H.263: Line Transmission of Non-Telephone Signals, Video Coding for Low Bitrate Communication" (hereinafter "ITU-T Recommendation H.263"). Briefly, in H.263 and other encoded video signal standards, a digital motion video image signal, which is sometimes called a video stream, is organized hierarchically into groups of pictures which include one or more frames, each of which represents a single image of a sequence of images of the video stream. Each frame includes a number of macroblocks which define respective portions of the video image of the frame. An I-frame is encoded independently of all other frames and therefore represents an image of the sequence of images of the video stream without reference to other frames. P-frames are motion-compensated frames and are therefore encoded in a manner which is dependent upon other frames. Specifically, a P-frame is a predictively motion-compensated frame and depends only upon one I-frame or, alternatively, another P-frame which precedes the P-frame in the sequence of frames of the video image. The H.263 standard also describes BP-frames; however, for the purposes of description herein, a BP-frame is treated as a P-frame.

All frames are compressed by reducing redundancy of image data within a single frame. Motion-compensated frames are further compressed by reducing redundancy of image data within a sequence of frames. Since a motion video signal includes a sequence of images which differ from one another only incrementally, significant compression can be realized by encoding a number of frames as motion-compensated frames, i.e., as P-frames. However, errors from noise introduced into the motion video signal or artifacts from encoding of the motion video signal can be perpetuated from one P-frame to the next and therefore persist as a rather annoying artifact of the rendered motion video image. It is therefore desirable to periodically send an I-frame to eliminate any such errors or artifacts. Conversely, I-frames require many times more bandwidth, e.g., on the order of ten times more bandwidth, than P-frames, so encoding I-frames too frequently consumes more bandwidth than necessary. Accordingly, determining when to include an I-frame, rather than a P-frame, in an encoded video stream is an important consideration when maximizing video image quality without exceeding available bandwidth.

Another important consideration when maximizing video image quality within limited signal bandwidth is the compromise between image quality of and bandwidth consumed by the encoded video signal as represented by an encoding parameter $\lambda$. In encoding a video signal, a particular value of encoding parameter $\lambda$ is selected as a representation of a specific compromise between image detail and the degree of compression achieved. In general, a greater degree of compression is achieved by sacrificing image detail, and image detail is enhanced by sacrificing the degree of achievable compression of the video signal. In the encoding standard H.263, a quantization parameter Q effects such a comprise between image quality and consumed bandwidth by controlling a quantization step size during quantization in an encoding process.

However, a particular value of encoding parameter $\lambda$ which is appropriate for one motion video signal can be entirely inappropriate for a different motion video signal. For example, motion video signals representing a video image which changes only slightly over time, such as a news broadcast (generally referred to as "talking heads"), can be represented by relatively small P-frames since successive frames differ relatively little. As a result, each frame can include greater detail at the expense of less compression of each frame. Conversely, motion video signals representing a video image which changes significantly over time, such as fast motion sporting events, require larger P-frames since successive frames differ considerably. Accordingly, each frame requires greater compression at the expense of image detail.

Determining an optimum value of encoding parameter $\lambda$ for a particular motion video signal can be particularly difficult. Such is especially true for some motion video signals which include both periods of little motion and periods of significant motion. For example, in a motion video signal representing a football game includes periods where both teams are stationary awaiting the snap of the football from the center to the quarterback and periods of sudden extreme motion. Selecting a value of encoding parameter $\lambda$ which is too high results in sufficient compression that frames are not lost during high motion periods but also in unnecessarily poor image quality during periods were players are stationary or moving slowly between plays. Conversely, selecting a value of encoding parameter $\lambda$ which is too low results in better image quality during periods of low motion but likely results in loss of frames due to exceeded available bandwidth during high motion periods.

A third factor in selecting a balance between motion video image quality and conserving available bandwidth is the frame rate of the motion video signal. A higher frame rate, i.e., more frames per second, provides an appearance of smoother motion and a higher quality video image. At the same time, sending more frames in a given period of time consumes more of the available bandwidth. Conversely, a lower frame rate, i.e., fewer frames per second, consumes less of the available bandwidth but provides a motion video signal which is more difficult for the viewer to perceive as motion between frames and, below some threshold, the motion video image is perceived as a "slide show," i.e., a sequence of discrete, still, photographic images. However, intermittent loss of frames resulting from exceeding the available threshold as a result of using an excessively high frame rate provides a "jerky" motion video image which is more annoying to viewers than a regular, albeit low, frame rate.

I-frame placement and encoding parameter $\lambda$ value selection combine to represent a compromise between motion video image quality and conservation of available bandwidth. However, to date, conventional motion video encoders have failed to provide satisfactory motion video image quality within the available bandwidth.

SUMMARY OF THE INVENTION

In accordance with the present invention, a primary open loop rate control selects an optimized encoding parameter $\lambda$ by determining a desired size for an individual frame and comparing the size of the frame as encoded to the desired size. Encoding parameter $\lambda$ represents a compromise between the distortion introduced into a motion video signal as a result of encoding the motion video signal and the amount of data required to represent the motion video signal as encoded and therefore the amount of bandwidth consumed in delivering the encoded motion video signal. A specific value of encoding parameter $\lambda$ represents a specific compromise between image quality and consumed bandwidth. Encoding a motion video signal in accordance with encoding parameter $\lambda$ effects the compromise between consumed bandwidth and video image quality represented by encoding parameter $\lambda$. If the encoded frame size is greater than the desired size, encoding parameter $\lambda$ is increased to reduce the size of subsequently encoded frames to consume less bandwidth at the expense of image quality. Conversely, if the encoded frame size is less than the desired size, encoding parameter $\lambda$ is reduced to increase the size of subsequently encoded frames to improve image quality and to fully consume available bandwidth. As a result, each frame is encoded in a manner which maximizes image quality while approaching full consumption of available bandwidth and guarding against exceeding available bandwidth.

Further in accordance with the present invention, a secondary close loop rate control ensures that overall available bandwidth is never exceeded. Encoding parameter $\lambda$ is selected by accumulating a cumulative bandwidth error which represents the amount by which bandwidth consumed by encoding a motion video signal deviates from the amount of bandwidth which is available for encoding of the motion video signal. The cumulative bandwidth error accumulates as time passes and is consumed by encoded frames which are transmitted through the communication medium whose bandwidth is measured. Encoding frames which are consistently slightly too large results in incremental reductions in the cumulative bandwidth error which can have a negative value and which can grow in magnitude as a result of such reductions. In response to the reduction of the cumulative bandwidth error, encoding parameter $\lambda$ is increased to reduce the size of subsequently encoded frames to consume less bandwidth at the expense of image quality. Encoding frames which are consistently slightly too small results in a incremental increases in the cumulative bandwidth error. In response to the increases in the cumulative bandwidth error, encoding parameter $\lambda$ is decreased to increase the size of subsequently encoded frames to improve image quality and to fully consume available bandwidth. As a result, gradual trends of the primary open loop rate control which allow available bandwidth to accumulate or to be exceeded are thwarted. In addition, secondary closed loop rate control contributes to selecting an optimum compromise between image quality and available bandwidth.

Further in accordance with the present invention, motion video images which change from a slow changing scene to a rapidly changing scene are detected and encoding parameter $\lambda$ is adjusted to more quickly adapt to the changing motion video signal and to continue to provide a particularly desirable compromise between image quality and available bandwidth. In particular, the absolute pixel difference between two consecutive frames is measured. Previously measured absolute pixel differences corresponding to previously encoded frames of the motion video signal are filtered to form a filtered previous absolute pixel difference. Encoding parameter $\lambda$ is adjusted in accordance with the absolute pixel difference and the filtered previous absolute pixel difference independently of changes to encoding parameter $\lambda$ as determined by the primary open loop rate control and secondary closed loop rate control described above. In particular, if the current absolute pixel difference is greater than the filtered previous absolute pixel difference, showing an increase in the rate of change between frames, encoding parameter $\lambda$ is increased to reduce the size of subsequently encoded frames and to thereby make additional bandwidth available for such encoded frames. Conversely, if the current absolute pixel difference is less than the filtered previous absolute pixel difference, a decrease in the rate of change between frames is detected and encoding parameter λ is decreased to improve image quality and to more fully consume available bandwidth. As a result, the optimum compromise achieved by the primary open loop rate control and the secondary closed loop rate control is more stable, i.e., reaches equilibrium more quickly, when the rate of change between frames of a motion video image changes significantly and rapidly.

Further in accordance with the present invention, a scene change between frames of a motion video signal are detected and the first frame of the new scene is encoded as an I-frame. As a result, the encoded frame is only slightly larger than an equivalent P-frame since a scene change represents a particularly large change between the current frame and the previous frame. In addition, the encoding of the next I-frame is postponed until the expiration of a full I-frame interval which starts with the encoding of the scene change I-frame, even if the previous I-frame interval had partially elapsed but had not expired prior to encoding of the I-frame. A scene change is detected by measuring the absolute pixel difference between the current frame and the previous frame, filtering the absolute pixel difference with a previously filtered absolute pixel difference, and comparing the newly filtered absolute pixel difference to a threshold. The threshold is proportional to the previously filtered absolute pixel difference. If the newly filtered absolute pixel difference is greater than the threshold, the current frame is determined to be the first frame of a new scene and is therefore encoded as an I-frame.

Each of these mechanisms represents a significant improvement over the prior art and enhances the quality of a motion video image without exceeding available bandwidth. These mechanisms can be used individually or in combination.

DETAILED DESCRIPTION

Figure 1:
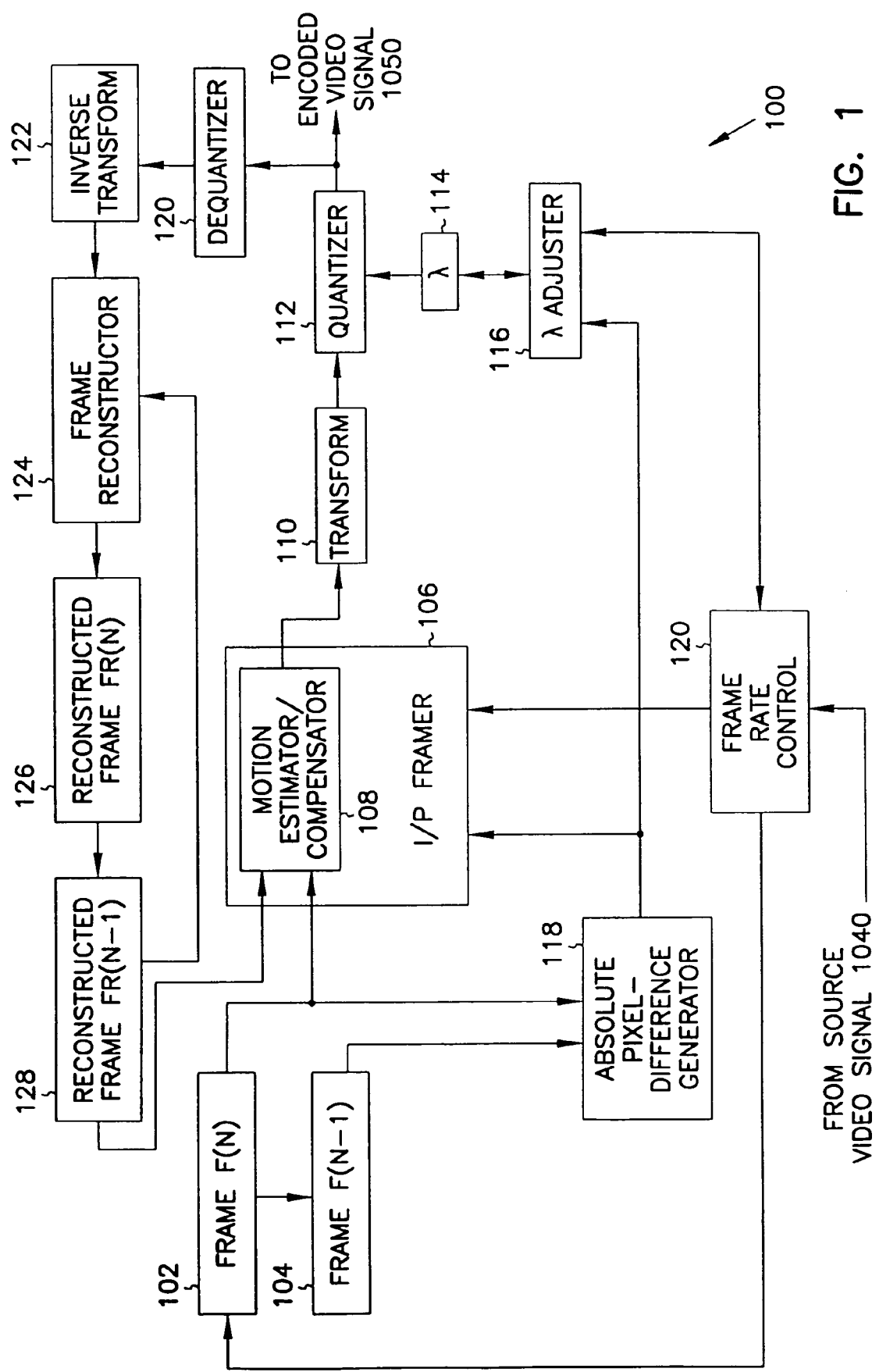
FIG. 1 is a block diagram of a video signal encoder according to the present invention.

In accordance with the present invention, a video signal encoder 100 (FIG. 1) maximizes image quality without exceeding bandwidth available for transmitting the encoded motion video signal. Video signal encoder 100 receives a frame of a video signal from a video source (not shown in FIG. 1) which can include, for example, a video camera, a video cassette player, a video laser disk player, or similar video source. Video signal encoder 100 stores the frame in buffer 102 after moving any frame previously stored in buffer 102 into buffer 104. Thus, video signal encoder 100 stores two consecutive frames in buffers 102 and 104. The frame stored in buffer 102 is sometimes referred to herein as the current frame, and the frame stored in buffer 104 is sometimes referred to herein as the previous frame. I/P framer 106 of video signal encoder 100 includes a motion estimator/compensator 108 which retrieves the current frame from buffer 102 and a reconstructed previous frame from a buffer 128 and derives motion vectors which represent motion between the current and reconstructed previous frames. The reconstructed previous frame is reconstructed from a previously encoded frame as described more completely below. For each of one or more macroblocks of the current frame, motion estimator/compensator 108 derives a motion vector which specifies a portion of the reconstructed previous frame which the macroblock corresponds and an associated motion vector error signal. A motion vector specifies a motion-compensated macroblock in terms of a vector to an equal-sized portion of another frame. A macroblock specified by a motion vector of a particular macroblock is sometimes referred to herein as a macroblock which is temporally displaced from the particular macroblock. A motion vector error signal represents an amount of variation between the macroblock and a temporally displaced macroblock of the macroblock.

Motion estimator/compensator 108 produces a current motion-compensated frame from the motion vectors and the current and reconstructed previous frames received from buffers 102 and 128. Motion estimator/compensator 108 passes the motion-compensated frame to transform coder 110 which performs a transformation, e.g., a direct cosine transformation (DCT), on the motion-compensated macroblocks of the motion-compensated frame to produce a transformed frame. Transform coder 110 passes the transformed frame to a quantizer 112. Quantizer 112 quantizes coefficients used in transform coder 110 and these coefficients are then used later for Huffman coding the transformed frame to complete compression of the current frame retrieved from buffer 102. Huffman coding is described more completely in copending U.S. patent application Ser. No. 08/818,805 now abandoned, for "Method and Apparatus for Implementing Motion Detection and Estimation in Video Compression" filed on Mar. 14, 1997, and that description is incorporated herein by reference.

As described briefly above, a reconstructed previous frame is used to estimate motion between consecutive frames. The reconstructed previous frame is formed as follows. A dequantizer 120 receives the encoded current frame from quantizer 112 and performs the inverse of the quantization performed by quantizer 112. The dequantized frame is transferred from dequantizer 120 to a transform decoder 122 which performs an inverse transformation of the transformation performed by transform coder 110. A frame reconstructor 124 receives the transformed frame and reconstructs a reconstructed current frame therefrom. Specifically, frame reconstructor 124 reconstructs motion-compensated macroblocks of the frame received from transform decoder 122 by reference to a previously reconstructed frame stored in buffer 128. The reconstructed current frame is stored in a buffer 126 and the reconstructed frame which is previously stored in buffer 126 is moved to buffer 128. Therefore buffer 128 stores a reconstructed previous frame which is reconstructed from the previously encoded frame. Dequantizer 120, transform decoder 122, and frame reconstructor 124 are conventional.

Quantization by quantizer 112 is important in the encoding of a frame because a significant loss of signal for the sake of better compression can happen during quantization of the transform parameters. Quantization of coefficients used in transform coder 112 is known and is described, for example, in ITU-T Recommendation H.263 and that discussion is incorporated herein by reference. During quantization, and during other steps in the encoding of a motion video signal, an expression, D+λR, represents a selected compromise between motion video image quality and the degree of compression and thus consumed bandwidth. Specifically, D represents the distortion of a particular block of a frame of the motion video signal, i.e., the amount by which the block as encoded deviates from the block prior to encoding, and R represents the rate, i.e., amount of data required to encode the block. λ 114 (FIG. 1) stores a value of the encoding parameter λ which represents a specific trade-off between distortion and rate.

The expression, D+λR, is known and is used to select among various options when encoding a motion video signal. Generally, the expression, D+λR, is evaluated for each of a number of encoding options and the option for which the expression has a minimized value is selected as having the best compromise between image quality and available bandwidth. In particular, such selections are typically made during quantization where the bulk of image quality sacrifices for better compression are made. In general, a larger value stored in λ 114 results in a greater degree of compression, and thus less consumed bandwidth, at the expense of greater signal loss. Conversely, a smaller value stored in λ 114 generally results in less signal loss at the expense of a smaller degree of compression and thus greater consumed bandwidth.

As described above in greater detail, the appropriate value of λ 114 for a given motion video signal depends on the particular subject matter of the particular motion video signal and, in fact, can change dramatically within a given motion video signal. Accordingly, λ 114 is controlled by a λ adjuster 116. λ adjuster 116 is shown in greater detail in FIG. 2. λ adjuster 116 includes generally two λ adjustment mechanisms. The first includes a primary open loop rate control 202 and a secondary closed loop rate control 204. The second includes a λ pre-compensator 206.

In general, primary open loop rate control 202 (FIG. 2) adjusts λ 114 for each P-frame to achieve a desired size of encoded P-frame. Processing of primary open loop rate control 202 is illustrated generally by logic flow diagram 300 (FIG. 3) in which processing begins with loop step 302. Loop step 302, in conjunction with next step 314, defines a loop in which each P-frame is processed according to steps 304–312. In step 304, primary open loop rate control 202 (FIG. 2) determines a target size for the current P-frame. In general, the target size represents an ideal size for the current P-frame such that exactly the entire available bandwidth is completely consumed by the motion video stream produced by video signal encoder 100 (FIG. 1). First, the amount of total bandwidth occupied by I-frames is determined and subtracted from the total available bandwidth to determine the amount of bandwidth available for P-frames. In one embodiment, an I-frame is encoded every 6.5 seconds in a frame rate of 10 frames per second, and I-frames occupy about 10–15% of the available bandwidth. Accordingly, 85–90% of the total available bandwidth is available for P-frames. The target frame size for the current P-frame is determined from the time elapsed between the current P-frame and the previous frame and the amount of total available bandwidth for P-frames. If P-frames are encoded in such a way that each P-frame is smaller than the target size, then additional bandwidth is available and video image quality is unnecessarily poor. Conversely, if P-frames are encoded in such a way that each P-frame is larger than the target size, then the available bandwidth will eventually be exceeded.

In test step 306 (FIG. 3), primary open loop rate control 202 (FIG. 2) determines whether the current P-frame, i.e., the P-frame most recently encoded by I/P framer 106 (FIG. 1) is larger than the target size. If the current P-frame is larger than the target size, processing transfers from test step 306 (FIG. 3) to step 308. In step 308, primary open loop rate control 202 (FIG. 2) increases λ 114 to thereby cause subsequent frames to be encoded with an increased degree of compression and a commensurate degradation of motion video image quality. By increasing the degree of compression of the motion video signal, exceeding the available bandwidth is avoided.

In one embodiment, λ 114 is increased according to the following equation.

$$d\lambda = \lambda \cdot (\text{surplus}/\text{target}) \cdot \text{damping\_factor} \quad (1)$$

Figure 3:
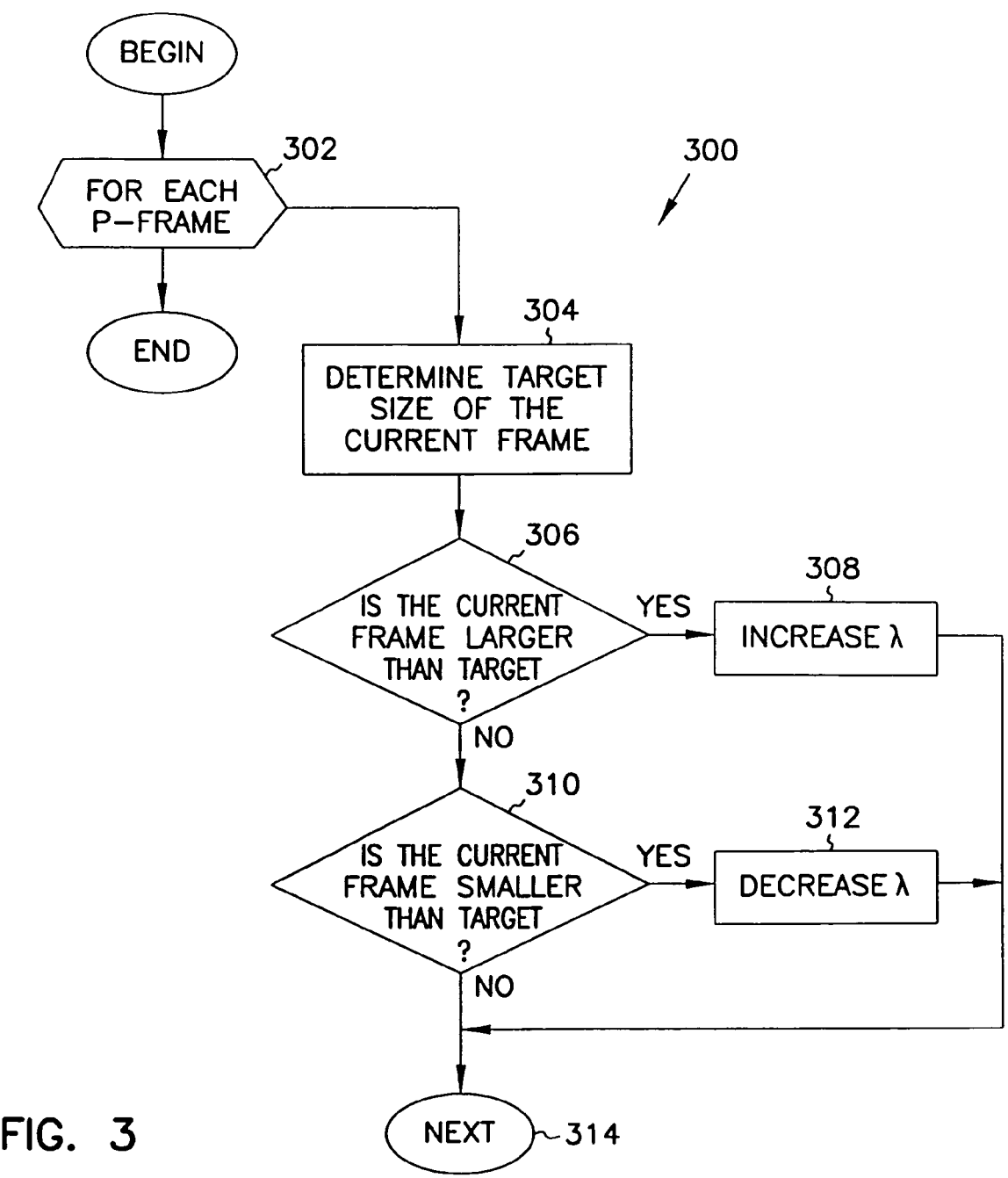
FIG. 3 is a logic flow diagram illustrating the processing of the primary open loop rate control of FIG. 2.

In equation (1), dλ represents the amount by which λ 114 is changed in step 308 (FIG. 3). Target represents the target size, and surplus represents the amount by which the current frame exceeds the target size. Thus, λ 114 is increased in step 308 by an amount which is proportional to the percentage of the target size which is exceeded by the current P-frame. Damping_factor represents a percentage of the correction, i.e., surplus/target, which is applied to λ 114 in a single performance of step 308 and is 0.1 (i.e., 10%) in one embodiment. Application of a full correction of λ 114 in each and every performance of step 308 causes λ 114 to vary widely and frequently such that the encoded motion video signal varies significantly and frequently in quality and the visual effect of such is annoying to viewers. By setting damping_factor to 0.1, changes in λ 114 and, accordingly, in the motion video image quality are smoothed.

In general, it is preferred that λ 114 (FIGS. 1 and 2) changes sufficiently to quickly converge to a relatively optimum value such that image quality is maximized while available bandwidth is not exceeded. However, configuring λ adjuster 116 to adjust λ 114 excessively to converge too quickly can cause the value of λ 114 to be over-adjusted such that correction in the reverse direction is required for subsequent frames. As a result, the value of λ 114 oscillates, and such oscillation can produce perceptible and undesirable artifacts in the decoded motion video signal. Therefore, it is preferred that λ 114 changes quickly enough to converge quickly to a relatively optimum value but changes slowly enough to avoid oscillation about the relatively optimum value. The adjustments to λ 114 described herein have been determined to provide acceptable results.

After step 308 (FIG. 3), processing of the current P-frame by primary open loop rate control 202 (FIG. 2) is complete.

If, in test step 306 (FIG. 3), primary open loop rate control 202 (FIG. 2) determines that the size of the current P-frame is not larger than the target size, processing transfers to test step 310 (FIG. 3). In test step 310, primary open loop rate control 202 (FIG. 2) determines whether the size of the current P-frame is smaller than the target size. If the size of the current frame is not smaller than the target size, processing of the current P-frame by primary open loop rate control 202 is complete. Thus, if the size of the current P-frame is equal to the target size, $\lambda$ 114 is not adjusted by primary open loop rate control 202. Conversely, if the size of the current frame is smaller than the target size, processing transfers from test step 310 (FIG. 3) to step 312.

In step 312, primary open loop rate control 202 (FIG. 2) decreases $\lambda$ 114 to increase the image quality of subsequent P-frames and to more completely utilize the bandwidth available for encoding of P-frames. In one embodiment, $\lambda$ 114 is decreased according to the following equation.

$$d\lambda = \lambda \cdot (\text{deficit/current\_size}) \cdot \text{damping\_factor} \quad (2)$$

In equation (2), $d\lambda$ represents the amount by which $\lambda$ 114 is changed in step 312. Current_size represents the size of the current P-frame, and deficit represents the amount by which the target size exceeds the size of the current frame. Thus, $\lambda$ 114 is decreased in step 312 by an amount which is proportional to the percentage of the size of the current P-frame which is exceeded by the target size. Damping_factor is directly analogous to the damping factor described above with respect to equation (1). In one embodiment, the damping factors in equations (1) and (2) are equivalent.

It is important to prevent $\lambda$ 114 from decreasing too rapidly in which case available bandwidth can easily and quickly be exceeded. Therefore, primary open loop rate control 202 (FIG. 2) prevents $\lambda$ 114 from being decreased by more than one-half of the previous value of $\lambda$ 114 in a single performance of step 312 (FIG. 3) in one embodiment. After step 312, processing of the current P-frame by primary open loop rate control 202 (FIG. 2) is complete.

Thus, primary open loop rate control 202 determines an appropriate and relatively optimum compromise between image quality and bandwidth availability by comparing the size of the current encoded P-frame to a target, theoretically optimum, encoded P-frame size. However, use of primary open loop rate control 202 alone does not guarantee that the total available bandwidth will not be exceeded. For example, if P-frames are consistently slightly larger than the target size, available bandwidth can be eventually exceeded. Therefore, secondary closed loop rate control 204 uses a cumulative bandwidth buffer to ensure that the total available bandwidth is never exceeded.

Secondary closed loop rate control 204 monitors a cumulative bandwidth error to ensure that small cumulative excesses of bandwidth overlooked by primary open loop rate control 202 do not result in the encoded motion video signal exceeding the overall available bandwidth. Specifically, if the cumulative bandwidth error grows too large in magnitude, adjustments to $\lambda$ 114 by secondary closed loop rate control 204 are large enough to compensate for any adjustments to $\lambda$ 114 by primary open loop rate control 202.

Processing by secondary closed loop rate control 204 is illustrated in logic flow diagram 400 (FIG. 4) in which processing begins in step 402. In step 402, secondary closed loop rate control 204 initializes a cumulative bandwidth error to represent an initial cumulative deviation from the available bandwidth when secondary closed loop rate control 204 initially begins processing. In one embodiment, the cumulative bandwidth error has an initial value of zero to indicate that the available bandwidth is not exceeded and is completely consumed. In step 404, secondary closed loop rate control 204 determines a maximum allowable cumulative bandwidth error, which is one (1) second in one embodiment. Specifically, a maximum allowable error is established and represents the amount of data which can be transferred through a delivery medium in one second. As described more completely below, secondary closed loop rate control 204 adjusts $\lambda$ 114 to prevent the cumulative bandwidth error from growing in magnitude, in either a positive direction or a negative direction, from zero. An excessively high positive cumulative bandwidth error indicates that too much bandwidth is being consumed and that delivery of the encoded motion video signal can be adversely affected. Conversely, an excessively high-magnitude negative cumulative bandwidth error indicates that more bandwidth is available than is being consumed and that the available bandwidth can support greater motion video image quality.

Loop step 406 and next step 418 define a loop in which each frame, both I-frames and P-frames, are processed according to steps 408–416. In step 408, secondary closed loop rate control 204 adjusts the cumulative bandwidth error according to the size of the current encoded frame, i.e., the most recently encoded frame received from I/P framer 106 (FIG. 1) whether an I-frame or a P-frame. In particular, secondary closed loop rate control 204 adds to the cumulative bandwidth error the amount of data which can by carried by the transmission medium in the time which elapses between the previous encoded frame and the current encoded frame. Secondary closed loop rate control 204 subtracts from the cumulative bandwidth error the amount of data used to encode the current frame. A particularly large encoded frame, such as an I-frame for example, consumes more bandwidth than allocated for the amount of time which elapses between the current encoded frame and the preceding encoded frame. Accordingly, secondary closed loop rate control 204 notes a decrease in the cumulative bandwidth error or an increase in the magnitude of the cumulative bandwidth error if the cumulative bandwidth error is negative. Conversely, a particularly small frame consumes less bandwidth than allocated for the time which elapses between the current encoded frame and a preceding encoded frame and results in an increase in the cumulative bandwidth error or a decrease in the magnitude of the cumulative bandwidth error if the cumulative bandwidth error is negative.

In test step 410, secondary closed loop rate control 204 determines whether the cumulative bandwidth error is less than zero, i.e., indicates that more than the available bandwidth is being consumed. If the cumulative bandwidth error is not less than zero, processing transfers to test step 414 which is described more completely below. Conversely, if the cumulative bandwidth error is less than zero, bandwidth consumption is exceeding the available bandwidth and processing transfers to step 412 in which secondary closed loop rate control 204 increases $\lambda$ 114. Accordingly, image quality is sacrificed to conserve bandwidth used by subsequent frames. In one embodiment, $\lambda$ 114 is adjusted according to the following equation.

$$d = \lambda \cdot (\text{error\_percentage} \cdot \text{damping\_factor} + 0.02) \quad (3)$$

In equation (3), $d\lambda$ represents the amount by which $\lambda$ 114 is adjusted in step 412. Error_percentage represents the percentage of the maximum allowable bandwidth error indicated by the cumulative bandwidth error. Damping_factor represents a percentage of error_percentage which is to be applied to $\lambda$ 114 for any one frame and is fixed at 10% in one embodiment. The constant 0.02 in equation (3) represents a minimum correction of $\lambda$ 114 whenever a negative cumulative bandwidth error is detected by secondary closed loop rate control 204. In equation (3), the minimum correction is 2% of the current value of $\lambda$ 114. Without a minimum correction factor of 0.02, small cumulative bandwidth errors would be permitted to grow significantly before the error_percentage of equation (3) grows large enough to correct λ 114. After step 412, processing of the current frame by secondary closed loop rate control 204 completes.

In test step 414, secondary closed loop rate control 204 (FIG. 2) determines whether the cumulative bandwidth error is greater than zero. If the cumulative bandwidth error is equal to zero, processing of the current frame by secondary closed loop rate control 204 completes and λ 114 is not adjusted since precisely the right amount of bandwidth is being consumed by the encoded motion video signal. Conversely, if the cumulative bandwidth error is greater than zero, unused bandwidth is accumulating and processing transfers to step 416 in which secondary closed loop rate control 204 decreases λ 114. Accordingly, video image quality is increased at the expense of increased bandwidth consumed by subsequent frames. This is appropriate since unused accumulating bandwidth is detected and using such bandwidth improves the overall perceived quality of the motion video image. Therefore, small excesses in consumed bandwidth which are undetected by primary open loop rate control 202 but which accumulate over time are detected by secondary closed loop rate control 204 and available bandwidth is not exceeded. In one embodiment, λ 114 is adjusted in accordance with equation (3) as described above with respect to step 412. In the context of step 416, dλ of equation (3) is negative to result in a decrease in λ 114. After step 416, processing of the current encoded frame by secondary closed loop rate control 204 completes.

Thus, primary open loop rate control 202 adjusts λ 114 for each encoded frame to reach an optimum compromise between image quality and conserved bandwidth while secondary closed loop rate control 204 ensures that small excessive uses of bandwidth do not accumulate such that frames are ultimately lost as a result of exceeding available bandwidth. It should be noted that adjustments to λ 114 in steps 412 (FIG. 4) and 416 are in addition to those made in steps 308 (FIG. 3) and 312. Accordingly, significant cumulative buffer errors resulting from small, incremental deviations from the target frame size permitted by primary open loop rate control 202 result in significant corrections by secondary closed loop rate control 204 which can overcome corrections to λ 114 made by primary open loop rate control 202 to guarantee that available bandwidth is not exceeded.

While primary open loop rate control 202 (FIG. 2) and secondary closed loop rate control 204 combine to quickly and effectively strike a near perfect balance between image quality and available bandwidth, quicker adjustments in λ 114 aided by λ pre-compensator 206 improve sudden transitions between high-motion and low-motion sequences of frames. Processing by λ pre-compensator 206 is illustrated in logic flow diagram 500 (FIG. 5) in which processing begins in step 502. In step 502, λ pre-compensator 206 (FIG. 2) receives from absolute pixel difference generator 118 (FIG. 1) an absolute pixel difference between the current frame and the previous frame. An absolute pixel difference between two frames is the average of the absolute value of the difference of each pair of corresponding pixels of the two frames. Absolute pixel difference generator 118 retrieves the current and previous frames from buffers 102 and 104, respectively, and determines the absolute value of the difference between corresponding pixels of the current and previous frames. From these determined absolute differences, absolute pixel difference generator 118 determines the average absolute difference per pixel between the two frames. The absolute pixel difference is a good indicator of overall differences between two frames. In contrast, root-mean-square differences between corresponding pixels of two frames exaggerates large differences between only a few pixels of the frames.

In step 504 (FIG. 5), λ pre-compensator 206 (FIG. 2) determines minimum and maximum pre-compensation limits to ensure that λ pre-compensator 206 does not excessively pre-compensate λ 114. In one embodiment, the minimum pre-compensation limit is the lesser of zero minus 25% of the current value of λ 114 and zero minus 50% of the initial value of λ 114. The initial value of λ 114 is described below in greater detail. In this same illustrative embodiment, the maximum pre-compensation limit is 50% of the initial value of λ 114. In step 506 (FIG. 5), λ pre-compensator 206 (FIG. 2) determines a pre-compensation weight. When an encoded motion video signal is to be delivered through a medium with a relatively high bandwidth, fine adjustments in the amount of bandwidth consumed is less important and image quality becomes paramount. Conversely, when transmission bandwidth is limited, aggressive bandwidth consuming measures such as aggressive pre-compensation of λ 114 prevent exceeding available bandwidth to such a degree that significant portions of the motion video signal are lost. Thus, the pre-compensation weight determined in step 506 selects a greater weight when available bandwidth is relatively scarce and a lesser weight when available bandwidth is relatively abundant. In one embodiment, the pre-compensation weight is determined according to the following equation.

$$k=128000./(\text{frame\_size\_ratio} \cdot \text{bit\_rate} + 128000.) \quad (4)$$

In equation (4), k is the pre-compensation weight. Frame_size_ratio represents a ratio of the predetermined frame size to the size of frames of source video signal 1040 and is therefore inversely proportional to the size of frames of source video signal 1040. In one embodiment, the predetermined reference frame size is 320 columns and 240 rows of pixels, i.e., 76,800 pixels. Bit_rate represents the available bandwidth of the delivery medium of the encoded motion video signal. Thus, as the size of frames decrease or as bit_rate increases, conserving bandwidth is less important and the pre-compensation weight of k decreases to approach a value of zero. Conversely, as the size of frames increase or as bit_rate decreases, conserving bandwidth becomes more important and the pre-compensation weight of k increases to approach a value of one.

Processing transfers to step 508 (FIG. 5) in which λ pre-compensator 206 (FIG. 2) determines a pre-compensation amount according to the current absolute pixel difference, the minimum and maximum pre-compensation limits, and the pre-compensation weight. Specifically, the pre-compensation amount is determined according to the following equation.

$$d\lambda = k \cdot (\text{abs\_diff}/(\text{prev\_abs\_diff} + 2.)) \quad (5)$$

In equation (5), dλ represents the pre-compensation percentage by which λ 114 is adjusted by λ pre-compensator 206. K represents the pre-compensation weight described above with respect to step 506 and equation (4). Abs_diff represents difference between the current absolute pixel difference received in step 502 (FIG. 5) and a filtered previous absolute pixel difference. Prev_abs_diff represents the filtered previous absolute pixel difference. The filtered previous absolute pixel difference is determined from previously received absolute pixel differences corresponding to previously encoded frames of the encoded motion video signal and is described more completely below with respect to step 510. Initially, i.e., prior to receipt of any absolute pixel difference, the filtered previous absolute pixel difference is set to an initial value. In one embodiment, the initial value of the filtered previous absolute pixel difference is zero. In an alternative embodiment, the initial value of the filtered previous absolute pixel difference is five.

Thus, the pre-compensation percentage is proportional to the percentage by which the current absolute pixel difference deviates from the filtered previous absolute pixel difference. In addition, the sign of the pre-compensation percentage reflects the direction of the deviation of the current absolute pixel difference from the filtered previous absolute pixel difference. Thus, if recently encoded frames of the encoded motion video signal change from one another by only a relatively small amount and the current frame represents significant change from the previous frame, then a large positive deviation from the filtered previous absolute pixel difference will be reflected in the current absolute pixel difference. Accordingly, λ pre-compensator 206 (FIG. 2) increases λ 114 by a relatively large percentage in anticipation of a potential shortage of available bandwidth as a result of the increase in differences between successive frames. Conversely, if recent frames of the encoded motion video signal change from one another by a relatively large amount and the current frame represents very little change from the previous frame, then a large negative deviation from the filtered previous absolute pixel difference will be reflected in the current absolute pixel difference. Accordingly, λ pre-compensator 206 decreases λ 114 by a relatively large percentage in anticipation of a potential surplus of available bandwidth resulting from the decrease in differences between successive frames. Of course, if there is very little difference between the current absolute pixel difference and the filtered previous absolute pixel difference, λ pre-compensator 206 makes little or no adjustment to λ 114 since no significant change in the amount of difference between successive frames is detected by λ pre-compensator 206.

By adding two to the filtered previous absolute pixel difference in the denominator of the ratio between the current absolute pixel difference and the filtered previous absolute pixel difference, λ pre-compensator 206 (FIG. 2) limits the amount by which λ pre-compensator 206 adjusts λ 114 to no more than one-half of the current absolute pixel difference. In addition, λ pre-compensator 206 limits that amount to no less than the minimum pre-compensation limit and to no more than the maximum pre-compensation limit in step 508 (FIG. 5).

Figure 5:
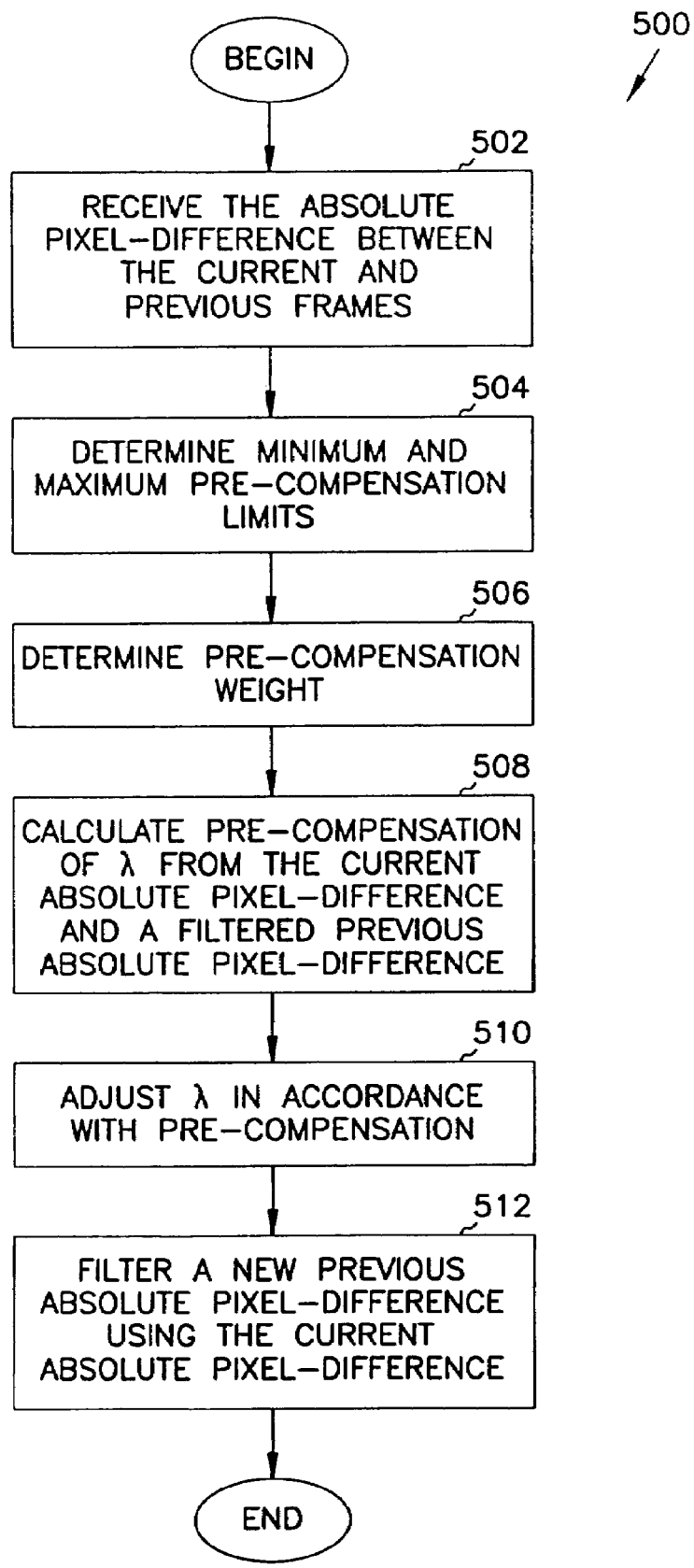
FIG. 5 is a logic flow diagram illustrating the processing of the λ pre-compensator of FIG. 2.

In step 510, λ pre-compensator 206 (FIG. 2) adjusts λ 114 by the percentage determined in step 508 (FIG. 5). From step 512, processing transfers to step 512.

In step 512, λ pre-compensator 206 (FIG. 2) applies a filter to the current absolute pixel difference and the filtered previous absolute pixel difference to produce a new filtered previous absolute pixel difference for use in a subsequent performance of step 508 (FIG. 5). In one embodiment, λ pre-compensator 206 (FIG. 2) applies a one-tap incident impulse response (IIR) filter to the current absolute pixel difference and the filtered previous absolute pixel difference to produce a new filtered previous absolute pixel difference. The following equation is illustrative.

$$\text{new\_prev\_abs\_diff} = (\text{curr\_abs\_diff} + \text{prev\_abs\_diff})/2. \quad (6)$$

Figure 2:
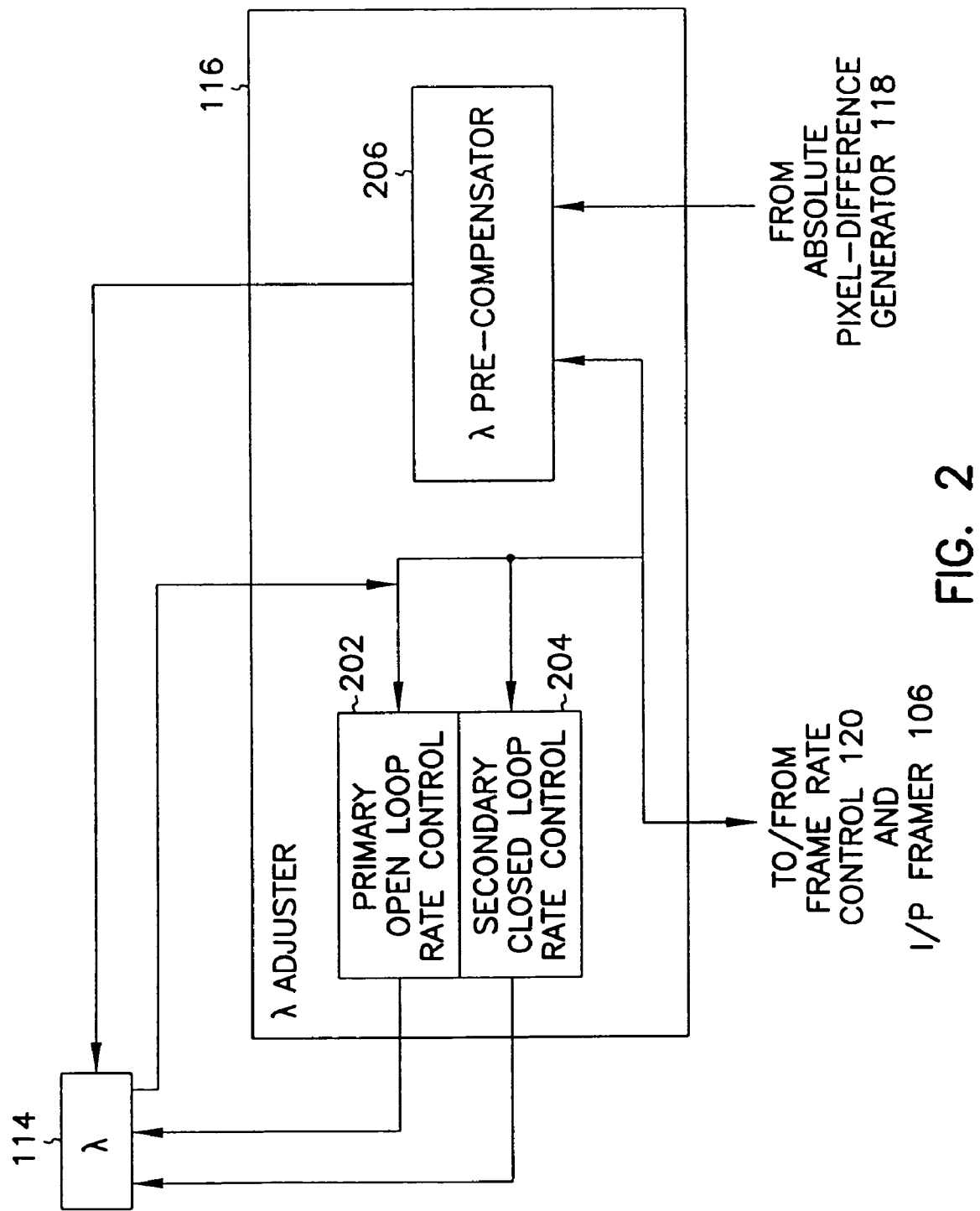
FIG. 2 is a block diagram of the encoding parameter λ adjuster of FIG. 1.

In equation (6), curr_abs_diff represents the current absolute pixel difference, and prev_abs_diff represents the filtered previous absolute pixel difference. New_prev_abs_diff represents the new filtered previous absolute pixel difference which supplants the filtered previous absolute pixel difference and is used as the filtered previous absolute pixel difference in a subsequent performance of step 508 (FIG. 5) by λ pre-compensator 206 (FIG. 2). By filtering previous absolute pixel differences, λ pre-compensator 206 ensures that an isolated, large deviation in the trend of absolute pixel differences between subsequent frames does not have a large effect on changes in λ 114 made by λ pre-compensator 206. In addition, λ pre-compensator 114 processes according to logic flow diagram 500 (FIG. 5) only when processing P-frames. Thus, a large absolute pixel difference associated with a scene change is not reflected in the filtered previous absolute pixel difference since the first frame of a new scene is encoded as an I-frame as described more completely below. Accordingly, λ pre-compensator 206 can more effectively track differences in bandwidth consumption across scene changes and more accurately predict and pre-compensate for changes in the amount of bandwidth consumed by subsequently encoded P-frames.

I-Frame Placement

As described above, I-frame placement is an important consideration in achieving an optimum balance between motion video image quality and available bandwidth. In general, I-frames are encoded periodically to clear any errors in the encoded motion video signal which can propagate from P-frame to P-frame. Therefore, an I-frame maximum interval specifies a maximum amount of time which is permitted to lapse between encoded I-frames. In one embodiment, the I-frame maximum interval is 10.0 seconds.

In addition to the I-frame maximum interval, it is periodically beneficial to encode a frame of the encoded motion video signal as an I-frame even if the I-frame maximum interval has not completely elapsed since the most recently encoded I-frame. In particular, when a scene changes in a motion video signal, i.e., when the current frame is generally unrelated to the previous frame, encoding the current frame as a P-frame requires nearly as much bandwidth as encoding the current frame as an I-frame. In addition, encoding the current frame as an I-frame eliminates noise which is perpetuated from P-frame to P-frame. Therefore, I/P framer 106 (FIG. 1) detects a scene change and, when a scene change is detected, encodes the current frame as an I-frame irrespective of the I-frame interval. Furthermore, graphical user interfaces which allow a user to skip forward or backward in the series of frames typically display only the encoded I-frames to simulate fast-forward or rewind playback. By encoding the first frame of a new scene as an I-frame, the user can skip forward or backward to the first frame of a particular scene.

Figure 6:
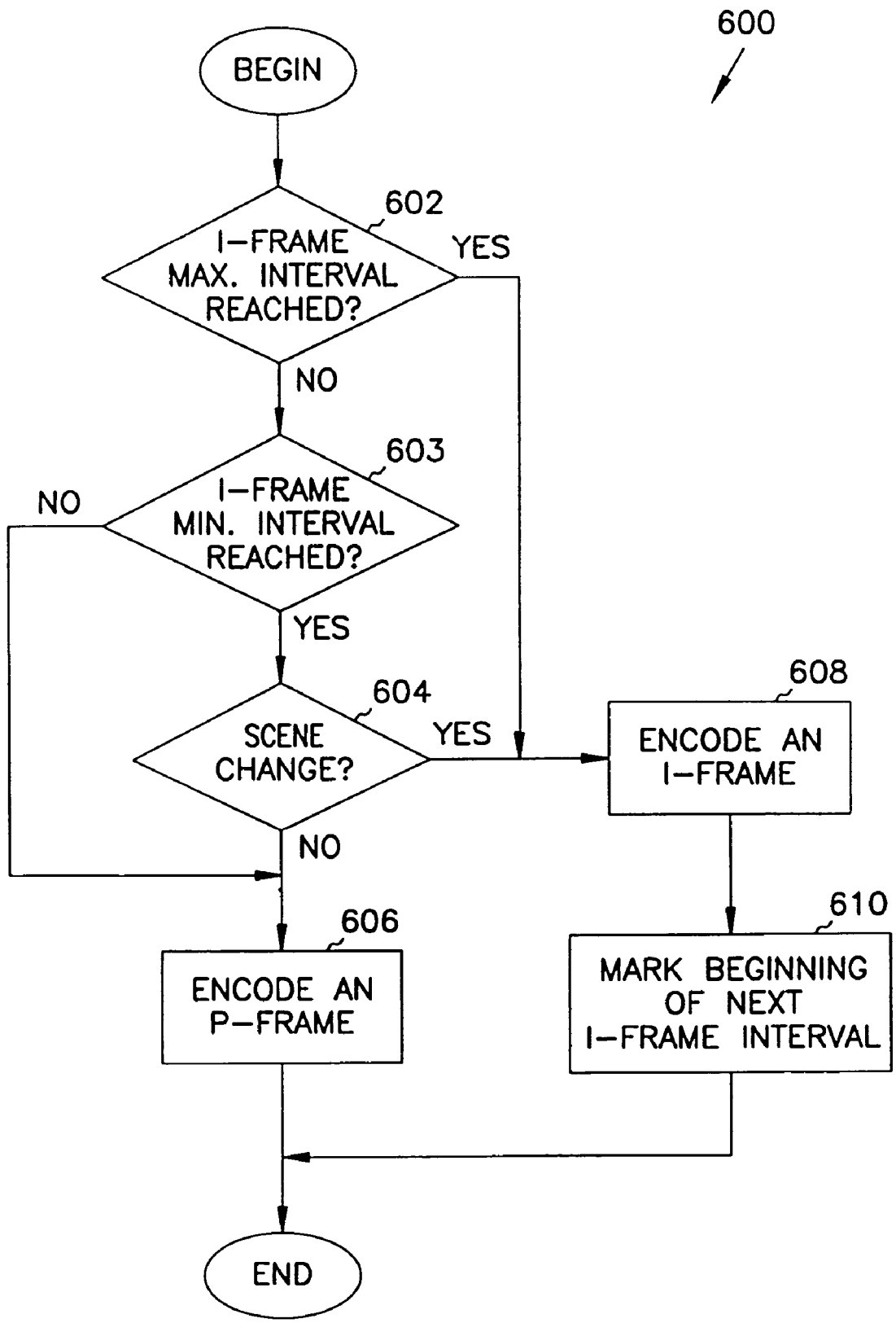
FIG. 6 is a logic flow diagram illustrating the processing of the I/P framer of FIG. 1.

Processing by I/P framer 106 is illustrated in logic flow diagram 600 (FIG. 6) in which processing begins in test step 602. In test step 602, I/P framer 106 (FIG. 1) determines whether the I-frame maximum interval has elapsed since the most recent encoding of an I-frame. I/P framer 106 makes such a determination by recording the time of the last frame which is encoded as an I-frame and comparing that time to the time of the current frame. I/P framer 106 determines time according to a conventional computer system clock in one embodiment. In this illustrative example, the I-frame maximum interval is 10.0 seconds. Therefore, in test step 602 (FIG. 6), I/P framer 106 (FIG. 1) compares the time elapsing between the most recently encoded I-frame and the current frame to 10.0 seconds. If at least 10.0 seconds have elapsed between the most recently encoded I-frame and the current frame, processing transfers to step 608 (FIG. 6) in which I/P framer 106 (FIG. 1) encodes the current frame as an I-frame. Conversely, if 10.0 seconds has not elapsed, processing transfers to test step 603 (FIG. 6).

In test step 603, I/P framer 106 (FIG. 1) determines whether a I-frame minimum interval has elapsed since the most recent encoding of an I-frame. Since I-frames consume much more bandwidth than do P-frames, an I-frame minimum interval specifies a minimum amount of time which must elapse between encoded I-frames. Accordingly, frames of the encoded motion video signal are not encoded as I-frames so frequently as to exceed available bandwidth. In one embodiment, the I-frame minimum interval is 0.5 seconds. In test step 603 (FIG. 6), I/P framer 106 (FIG. 1) compares the time elapsing between the most recently encoded I-frame and the current frame to 0.5 seconds. If less than 0.5 seconds have elapsed between the most recently encoded I-frame and the current frame, processing transfers to step 606 (FIG. 6) in which I/P framer 106 (FIG. 1) encodes the current frame as a P-frame. Conversely, if at least 0.5 seconds have elapsed, processing transfers to test step 604 (FIG. 6).

In test step 604, I/P framer 106 (FIG. 1) determines whether the current frame represents a scene change in the motion video signal. The manner in which I/P framer 106 makes such a determination is described below in greater detail in conjunction with logic flow diagram 604 (FIG. 7) which shows test step 604 more completely. If I/P framer 106 (FIG. 1) determines that the current represents a scene change in the motion video signal, processing transfers to step 608 (FIG. 6) in which I/P framer 106 encodes the current frame as an I-frame. Conversely, if I/P framer 106 (FIG. 1) determines that the current does not represent a scene change in the motion video signal, processing transfers to step 606 (FIG. 6) in which I/P framer 106 (FIG. 1) encodes the current frame as a P-frame. Thus, if the current frame represents a scene change or the I-frame interval has expired, I/P framer 106 encodes the current frame as an I-frame. Otherwise, I/P framer 106 encodes the current frame as a P-frame.

After step 608 (FIG. 6), I/P framer 106 (FIG. 1) marks the beginning of the next I-frame interval in step 610 (FIG. 6) since an I-frame is encoded in step 608. Thus, absent another scene change in less than the I-frame maximum interval, the next I-frame will be encode at the end of one I-frame maximum interval regardless of when the last I-frame was encoded. For example, if a scene changes 9.9 seconds into an I-frame maximum interval of 10.0 seconds, encoding another I-frame in 0.1 seconds would unnecessarily consume significant bandwidth and such is avoided. After step 606 (FIG. 6) or 610, processing of the current frame by I/P framer 106 (FIG. 1) completes.

Figure 7:
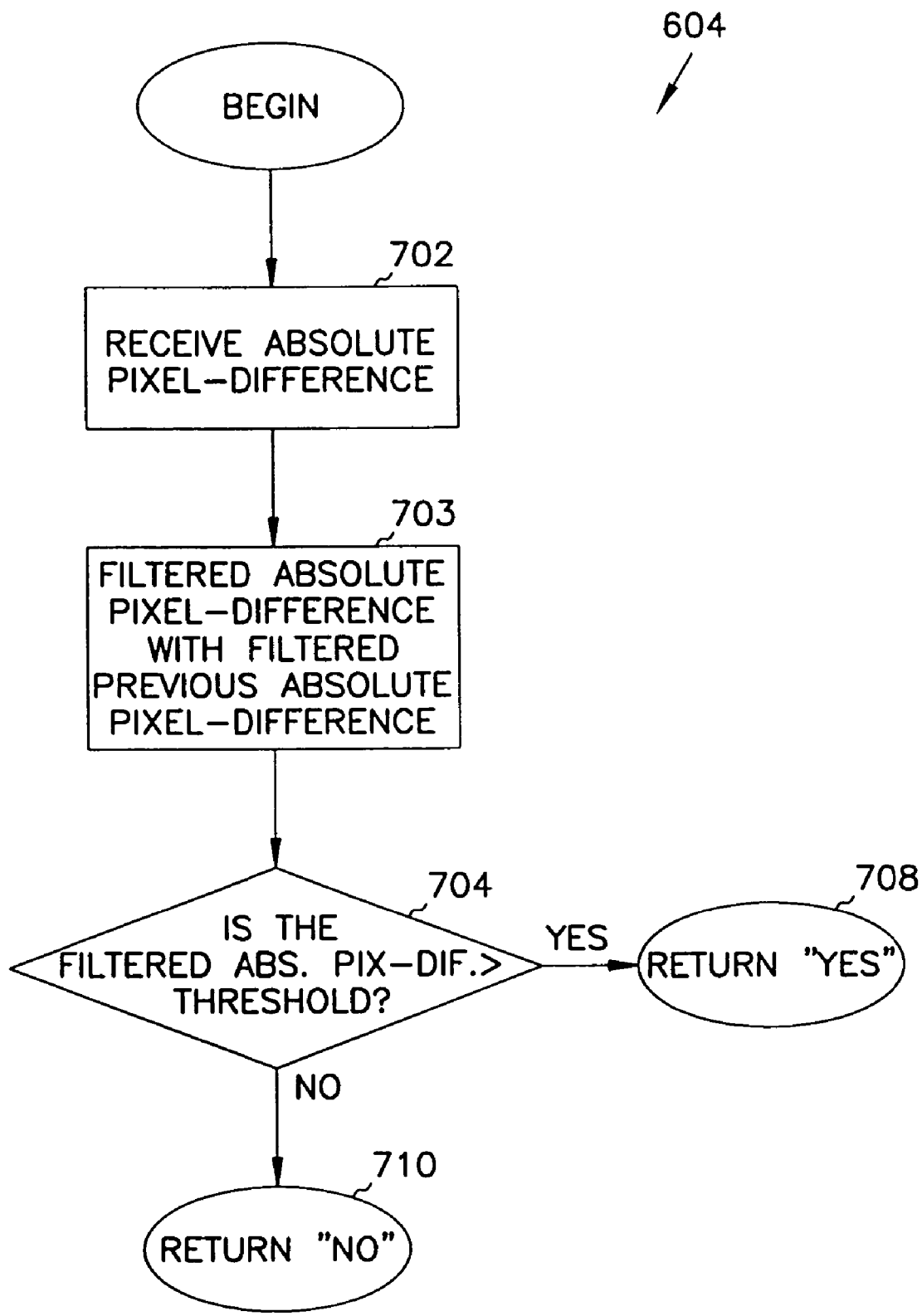
FIG. 7 is a logic flow diagram illustrating the determination by the I/P framer of FIG. 1 that the current frame of a motion video signal represents a scene change.

As described briefly above, I/P framer 106 determines whether the current frame represents a scene change in the motion video signal in test step 604 (FIG. 6) which is shown in greater detail as logic flow diagram 604 (FIG. 7). Processing according to logic flow diagram 604 begins with step 702 in which I/P framer 106 (FIG. 1) receives the absolute pixel difference from absolute pixel difference generator 118. Thus, the absolute pixel difference produced by absolute pixel difference generator 118 is used by both I/P framer 106 and λ adjuster 116. The absolute pixel difference is described above in greater detail and represents a measurement of the degree of change between the current frame and the previous frame. As described above, the absolute pixel difference is less susceptible to large changes in relatively view pixels and is therefore used to measure more accurately the degree of change between the frames as a whole.

While a large current absolute pixel difference can be a good indicator as to whether the current frame is the first frame of a new scene, selection of a single, fixed threshold of the current absolute pixel difference to make such a determination is difficult. Selection of a single, fixed threshold which is too low can cause frames in a high motion sequence to be misinterpreted as new scenes and encoded as I-frames and therefore consuming more bandwidth than can be spared. Conversely, selection of a single, fixed threshold which is too high can result in failing to detect the scene change and encoding frames representing scene changes as a P-frames and the efficiencies described above with respect to encoding I-frames at scene changes are not realized. Therefore, in step 703 (FIG. 7), to which processing transfers from step 702, I/P framer 106 (FIG. 1) uses the filtered previous absolute pixel difference determined by λ precompensator 206 (FIG. 2) in the manner described above to produce a scene change threshold. As described above, the filtered previous absolute pixel difference represents a filtered running weighted average of previous absolute pixel differences produced by absolute pixel-difference generator 118 (FIG. 1). Accordingly, the filtered previous absolute pixel difference represents the amount by which recently encoded frames differ from one another yet is not unduly influenced by a significant difference between only the two most recently encoded frames. In other words, the effect of any single frame is filtered by nearby frames in the encoded motion video signal in the manner described above. In step 703 (FIG. 7), I/P framer 106 (FIG. 1) produces a scene change threshold which is the greater of twenty or three times the filtered previous absolute pixel difference. By setting the scene change threshold to be at least twenty, transitions from very little motion to moderate motion are not misinterpreted as a new scene and bandwidth is not wasted in unnecessarily encoding a frame of only moderate difference from the previous frame as an I-frame.

Processing transfers from step 703 (FIG. 7) to test step 704 in which I/P framer 106 (FIG. 1) compares the absolute pixel difference to the scene change threshold. If I/P framer 106 determines that the absolute pixel difference received in step 702 (FIG. 7) is greater than the scene change threshold, I/P framer 106 (FIG. 1) determines that the current frame represents a scene change, i.e., is the first frame of a new scene, and processing transfers to terminal step 708 (FIG. 7) and that determination is reflected in terminal step 708. Processing according to logic flow diagram 604, and therefore step 604 (FIG. 6), terminates in step 708 (FIG. 7).

Thus, by comparing the amount of changes between consecutive frames to a predetermined threshold, I/P framer 106 (FIG. 1) recognizes scene changes and avoids encoding P-frames which do not realize significant bandwidth savings over equivalent I-frames. In other words, encoding the first frame of a new scene as a P-frame results in a P-frame which is practically the same size as an I-frame. In addition, since the I-frame interval is shifted at scene changes in the manner described above, encoding the next I-frame can be postponed until the expiration of a full I-frame interval. The following example is illustrative. Consider a scene change mid-way through an I-frame interval. Conventional systems encode a P-frame, which is substantially equivalent in size to an I-frame, at the scene change and encode an I-frame 5.0 seconds later (after one-half of the I-frame interval). In contrast, I/P framer 106 encodes the scene change as an I-frame and does not encode another I-frame until one full I-frame interval has elapsed, unless another scene change is detected prior to expiration of the full I-frame interval. Such provides a particularly efficient use of available bandwidth without unnecessarily sacrificing video image quality.

Frame Rate Control

As described above, another important consideration in maximizing motion video image quality within limited bandwidth is the frame rate, i.e., the number of frames encoded in a particular period of time. Video signal encoder 100 (FIG. 1) includes a frame rate controller 120 which adjusts the frame rate of the encoded video signal as necessary to preserve the motion video signal quality and to prevent loss of frames due to exceeded bandwidth limitations.

Frame rate controller 120 predicts a frame rate which is relatively optimum for the particular motion video signal which video signal encoder 100 is encoding. The predicted optimum frame rate is based upon such factors as the delivery bandwidth, the size of the current frame as encoded, and the cumulative bandwidth error described above. Some frame rate control mechanisms reduce frame rates of encoded motion video signals in response to detecting imminent exhaustion of available bandwidth. Such mechanisms, while generally effective at preventing exhaustion of available bandwidth, can perpetuate high latency as bandwidth is consumed to the point at which exhaustion of available becomes imminent and reduction of such latency can be rather difficult. By predicting a relatively optimum frame rate for a particular sequence of frames during encoding of the sequence, frame rate controller 120 can prevent unnecessarily high latency in the delivery of the encoded motion video signal and exhaustion of the available bandwidth is not a prerequisite to adjustment of the frame rate.

The controlling of the frame rate by frame rate controller 120 is illustrated in logic flow diagram 800 (FIG. 8) in which processing begins with step 802. In step 802, frame rate controller 120 (FIG. 1) determines an appropriate frame rate for the encoded motion video signal from λ 114 and the size of the current frame as encoded. The frame rate determined in step 802 is sometimes referred to as the sequence rate. Specifically, frame rate controller 120 calculates the sequence rate according to the following equation.

$$\text{seq\_rate} = (\text{avg\_worst\_}\lambda/\lambda) \cdot (\text{bit\_rate}/\text{frame\_size}) \quad (7)$$

Figure 8:
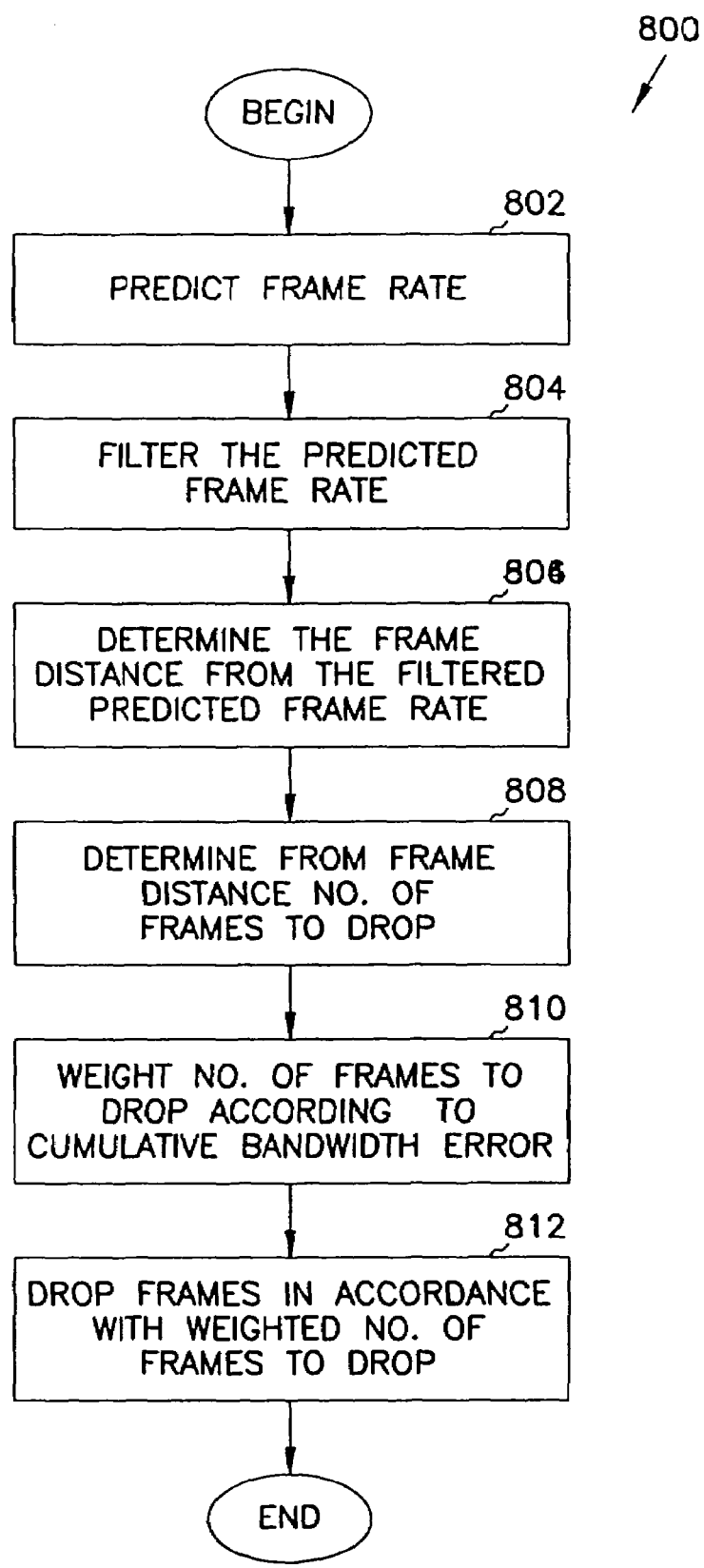
FIG. 8 is a logic flow diagram illustrating the processing of the frame rate controller of FIG. 1.

In equation (7), seq_rate represents to the sequence rate determined by frame rate controller 120 (FIG. 1) in step 802 (FIG. 8). Bit_rate represents the available delivery bandwidth in terms of an amount of data per unit of time. Frame_size represents the amount of data required to represent the current frame in its encoded form. Thus, the ratio of bit_rate/frame_size represents a number of copies of the current frame as encoded which can be carried by the delivery medium in a single unit of time, e.g., one second. This ratio serves as a starting point in predicting a relatively optimum frame rate for a sequence of frames of the encoded motion video signal which includes the current frame and recently encoded frames.

Avg_worst_λ in equation (7) represents a worst allowable average value of λ 114, i.e., the value of λ 114 which represents the worst image quality permissible over an appreciable amount of time. In equation (7), λ represents the value of λ 114. Frame rate controller 120 determines avg_worst_λ from an initial value of λ which is determined in a manner described more completely below and from a worst allowable λ which is selectable by a person designing the motion video signal who makes a number of decisions regarding the nature of the motion video signal. Frame rate controller 120 determines avg_worst_λ according to the following equation.

$$\text{avg\_worst\_}\lambda = (\text{init\_}\lambda + \text{worst\_}\lambda)/2. \quad (8)$$

In equation (8), init_λ represents the initial value of λ 114 which is described more completely below and worst_λ represents the worst allowable λ. The ratio in equation (7) of avg_worst_λ to λ 114 adjusts the ratio of bit_rate to frame_size according to the particular quality of the current encoded frame. For example, if λ 114 is smaller than avg_worst_λ, the ratio of avg_worst_λ to λ is greater than 1.0 and the predicted frame rate of step 802 according to equation (7) is larger than the ratio of bit_rate to frame_size. Such is appropriate since a small λ 114 indicates that the current frame is encoded with a higher image quality than is necessary and that a higher frame rate can be supported on the delivery medium. Conversely, if λ 114 is larger than avg_worst_λ, the ratio of avg_worst_λ to λ is less than 1.0 and the predicted frame rate of step 802 according to equation (7) is smaller than the ratio of bit_rate to frame_size. Such is appropriate since a large λ 114 indicates that the current frame is encoded with a lower image quality than is preferred and that a lower frame rate should be used such that better image quality can be obtained without exceeding available bandwidth.

Processing transfers from step 802 (FIG. 8) to step 804 in which frame rate controller 120 (FIG. 1) filters the predicted frame rate determined in step 802 with previously predicted frame rates, i.e., from previous performances of step 802, to produce a predicted sequence frame rate for a sequence of recently encoded frames of the encoded motion video signal. In one embodiment, frame rate controller 120 (FIG. 1) applies a one-tap IIR filter to the predicted frame rate. Specifically, frame rate controller 120 (FIG. 1) averages the predicted frame rate determined in step 802 (FIG. 8) with the previous predicted sequence frame rate determined in the preceding performance of step 804, i.e., with respect to the previous frame. Accordingly, extreme and frequent changes in the predicted sequence frame rate are prevented notwithstanding large variations in individual predicted frame rates determined in step 802.

In step 806, to which processing transfers from step 804, frame rate controller 120 (FIG. 1) determines a frame distance from the source frame rate and the predicted sequence frame rate. In one embodiment, the frame distance is the ratio of the source frame rate to the predicted sequence frame rate. The source frame rate is the frame rate of the motion video signal received by motion video signal encoder 100. The frame distance and the predicted sequence frame rate are floating point numbers to record minute changes in the predicted optimum frame rate even though fractional portions of the predicted optimum frame rate might not be reflected in the actual frame rate at which the motion video signal is encoded as described more completely below. The following example illustrates the determination of a frame distance by frame rate controller 120 (FIG. 1). Consider a motion video signal which is received by motion video signal encoder 100 and which has a frame rate of 30 frames per second. Consider further that the predicted sequence frame rate is determined by frame rate controller to be 20 frames per second. Frame rate controller 120 determines the frame distance to be 1.5 frames in step 806 (FIG. 8), i.e., that the encoded motion video signal should have one frame from every 1.5 frames of the source motion video signal. Thus, the frame distance represents a preferred distance between encoded frames in terms of the frame spacing of the source motion video signal.

Processing transfers to step 808 in which frame rate controller 120 (FIG. 1) determines a number of frames to drop in accordance with the frame distance determined in step 806. The number of frames to drop is one less than the frame distance but is at least zero. For example, if the frame distance determined in step 806 is 2.0, 1.0 (one less than 2.0) frames should be dropped between encoded frames such that one frame is encoded for every two frames of the source motion video signal.

In step 810 (FIG. 8), frame rate controller 120 (FIG. 1) determines a cumulative bandwidth weight to apply to the number of frames to drop determined in step 808 (FIG. 8). Specifically, frame rate controller 120 (FIG. 1) determines the cumulative bandwidth weight according to the following equation.

$$\text{weight}=-(\text{cum\_bw\_error}/\text{max\_bw\_error})+0.5 \qquad (9)$$

Figure 4:
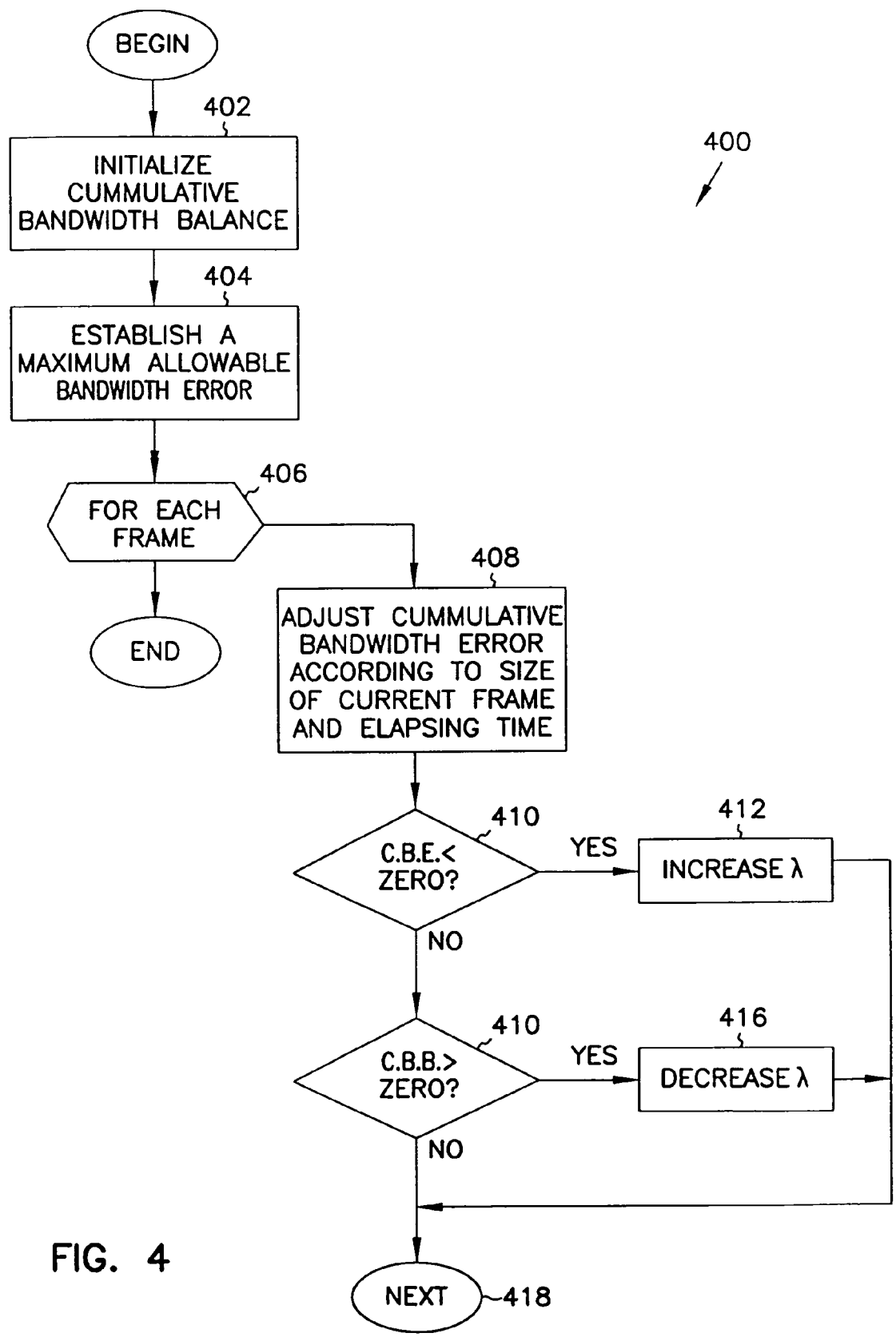
FIG. 4 is a logic flow diagram illustrating the processing of the secondary close loop rate control of FIG. 2.

In equation (9), weight represents the cumulative bandwidth weight; cum_bw_error represents the cumulative bandwidth error determined by secondary closed loop rate control 204 (FIG. 2) of λ adjuster 116 in step 408 (FIG. 4); and max_bw_error represents the maximum cumulative bandwidth error established by secondary closed loop rate control 204 (FIG. 2). in step 404 (FIG. 4). The negation in equation (9) causes the cumulative bandwidth weight to have a positive value when cumulative bandwidth used exceeds available bandwidth in which case the cumulative bandwidth error is negative. In one embodiment, the cumulative bandwidth weight is limited to no less than 0.5 and no more than 2.0. Frame rate controller 120 (FIG. 1) determines the cumulative bandwidth weight as an adjustment to compensate the predicted optimum frame rate for cumulative bandwidth surpluses or deficits.

Frame rate controller 120 adjusts the number of frames to drop using the cumulative bandwidth weight in step 810 (FIG. 8). For example, if the cumulative bandwidth error is negative and has a magnitude which is equal to the maximum cumulative bandwidth error, the cumulative bandwidth weight is 1.5, i.e., 150%. Thus, the number of frames to drop is increased by 50% by frame rate controller 120 (FIG. 1) in step 810 (FIG. 8). Such is appropriate since increasing the number of frames dropped, i.e., not encoded, between encoded frames consume less bandwidth when bandwidth is exceedingly scarce. Conversely, if the cumulative bandwidth error is zero, the cumulative bandwidth weight is 0.5, i.e., 50%, and frame rate controller 120 (FIG. 1) decreases the number frames to drop by 50%. Thus, when bandwidth is available, frame rate controller 120 causes motion video signal encoder 100 to encode more frames to improve the quality of the encoded motion video signal.

Up to this point in logic flow diagram 800 (FIG. 8), various frame rates and numbers of frames to drop are stored and processed by frame rate controller 120 (FIG. 1) as floating point numbers to preserve and properly process with relatively high precision such frame rates and numbers of frames to drop. In step 812 (FIG. 8), to which processing transfers from step 810, frame rate controller 120 (FIG. 1) determines the nearest integer of the floating point number of frames to drop as weighted in step 810 and drops that integer number of frames received from source video signal 1540 which is described in greater detail below. Frame rate controller 120 drops a frame by simply failing to storing the frame in frame buffer 102. If the weighted number of frames to drop is 1.2, for example, frame rate controller 120 encodes one frame, drops one subsequent frame, and encodes the next frame. Assuming the frame rate of the source motion video signal is 30 frames per second, the frame rate of the encoded motion video signal is 15 frames per second since one frame is dropped for every frame encoded. If the weighted number of frames to drop is 1.7, frame rate controller 120 encodes one frame, drops two subsequent frames, and encodes the next frame. Assuming the same 30-frames-per-second source video signal, the frame rate of the encoded motion video signal is 10 frames per second since two frames are dropped for every frame encoded.

λ Initialization

As described above, the particular value of λ 114 which is appropriate for encoding a particular motion video signal is dependent upon various characteristics of the motion video signal. If λ 114 initially has a value which is differs significantly from an optimum value for the motion video signal, either available bandwidth is consumed too quickly or image quality suffers unnecessarily until λ 114 is adjusted to have a more optimum value for the encoded motion video signal. Accordingly, λ adjuster 116 selects an initial value for λ 114 which is predicted to be appropriate for source video signal 1540, which is described in greater detail below. Specifically, λ adjuster 116 selects the initial value for λ 114 based on the frame size of source video signal 1540 and the delivery bandwidth at which encoded video signal 1550 is transmitted to a client computer system as described more completely below. The following equation shows the selection of the initial value of λ 114 by λ adjuster 116.

$$\text{init\_}\lambda=\text{ref\_}\lambda\cdot\text{ref\_rate}/(\text{frame\_size\_ratio}\cdot\text{bit\_rate}) \qquad (10)$$

Figure 9:
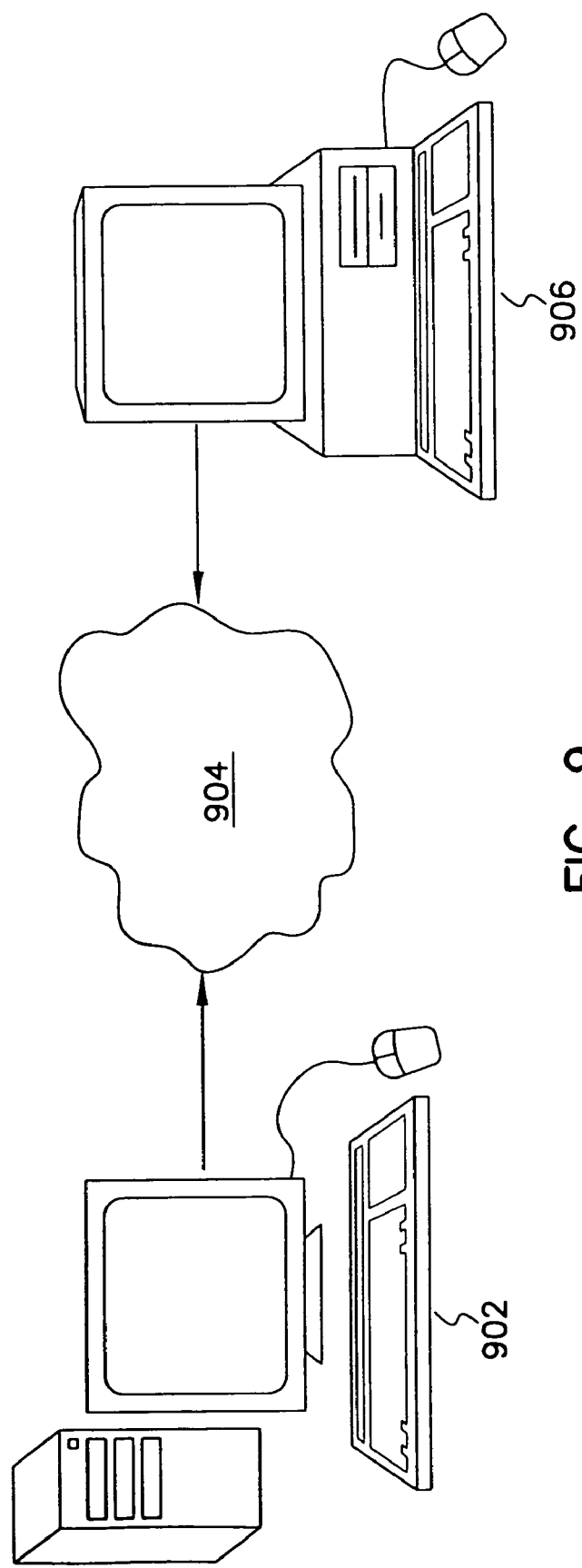
FIG. 9 is a block diagram of a server computer system, which includes the video signal encoder of FIG. 1, and a client computer system which includes a video signal decoder and a computer network which connects the two computers.
Figure 10:
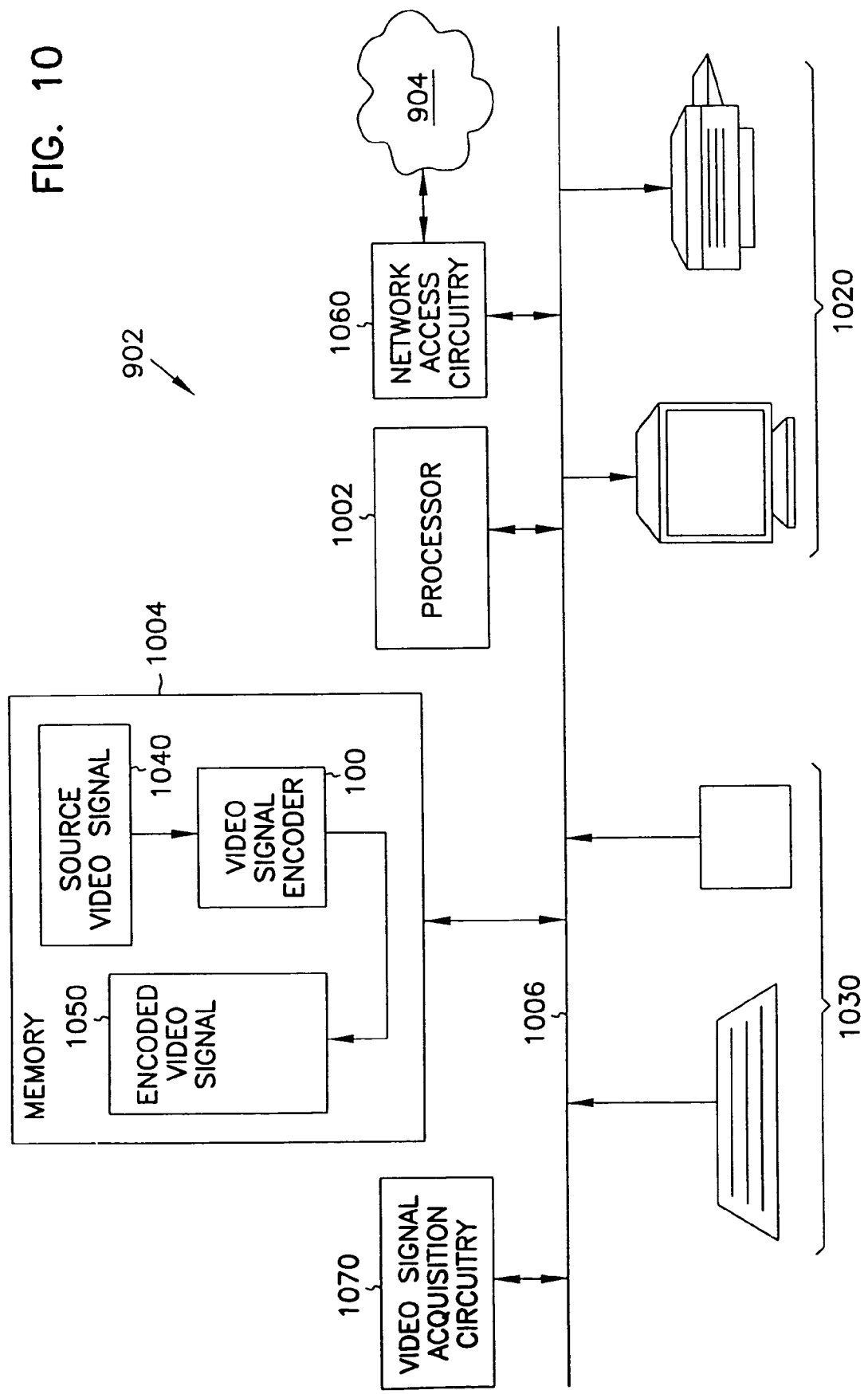
FIG. 10 is a block diagram of the server computer system of FIG. 9.
Figure 11:
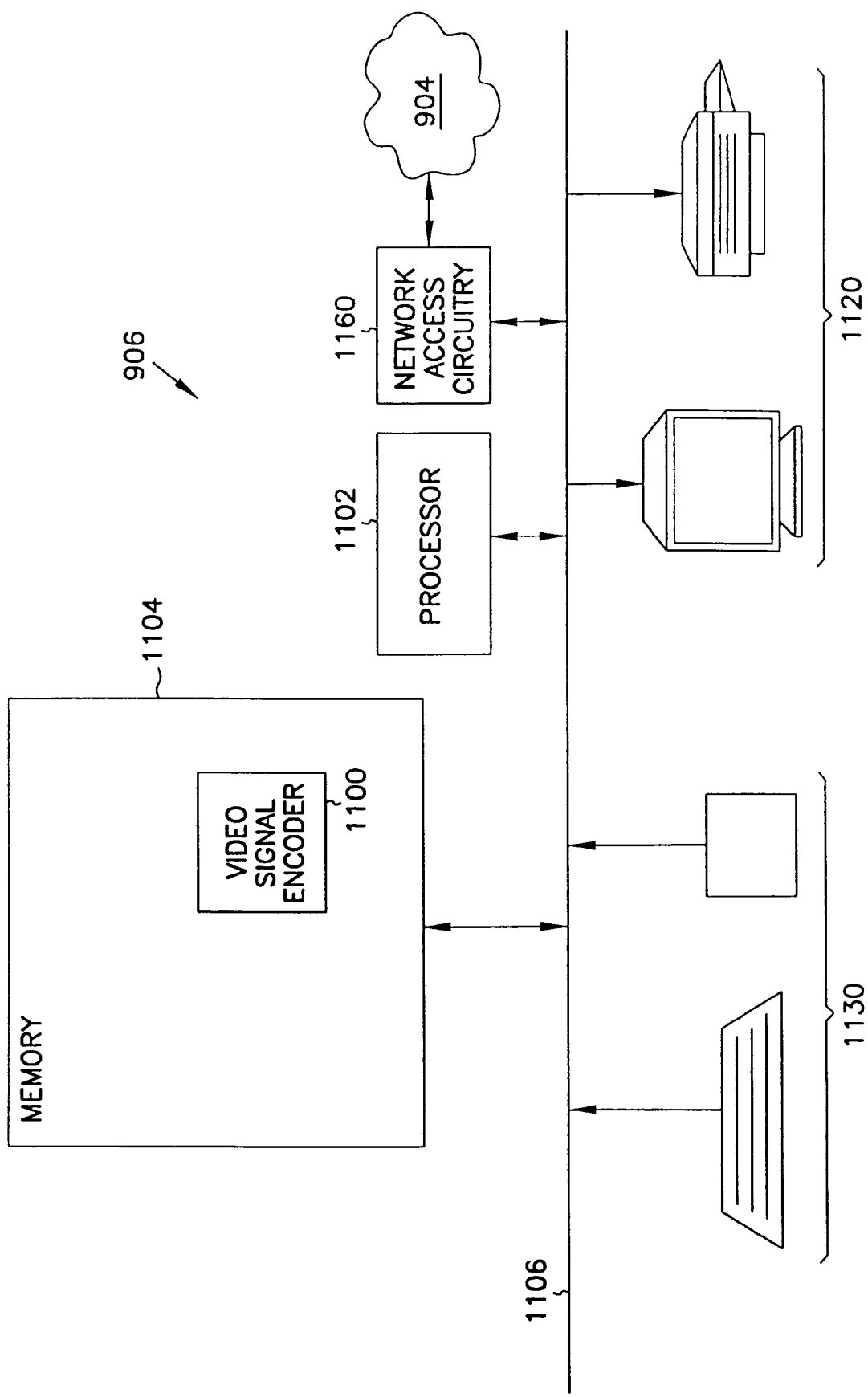
FIG. 11 is a block diagram of the client computer system of FIG. 9.

In equation (10), init_λ represents the initial value of λ 114 selected by λ adjuster 116. Ref_λ represents a predetermined value of λ which is generally appropriate for some predetermined frame size and some predetermined delivery bandwidth. Ref_rate represents the predetermined reference delivery bandwidth in terms of an amount of data per unit of time. Frame_size_ratio represents a ratio of the predetermined frame size to the size of frames of source video signal 1040 (FIG. 10) and is therefore inversely proportional to the size of frames of source video signal 1040. In one embodiment, the predetermined reference delivery bandwidth is 256,000 bits per second; the predetermined reference frame size is 320 columns and 240 rows of pixels, i.e., 76,800 pixels; and the predetermined value of λ is 30.0. Bit_rate represents the delivery bandwidth, i.e., the bandwidth at which encoded video signal 1050 can be delivered through network 904 (FIGS. 9–11).

Thus, if source video signal 1040 has frames which are larger than the predetermined reference frame size, the initial value of λ 114 (FIG. 1) is greater than the predetermined value to conserve delivery bandwidth at the expensive of image quality since the larger frames will likely consume more bandwidth than would frames of the predetermined reference size. Conversely, if source video signal 1040 (FIG. 10) has frames which are smaller than the predetermined reference frame size, the initial value of λ 114 (FIG. 1) is less than the predetermined value since smaller frames are likely to consume less bandwidth and image quality of encode video signal 1050 (FIG. 10) can be enhanced at the expense of bandwidth. In addition, if the delivery bandwidth of encoded video signal 1050 is greater than the predetermined reference bandwidth, the initial value of λ 114 (FIG. 1) is less than the predetermined value since more than the predetermined reference bandwidth is available and image quality of encoded video signal 1050 can be enhanced and additional bandwidth can be consumed. Conversely, if the delivery bandwidth of encoded video signal 1050 is less than the predetermined reference bandwidth, the initial value of λ 114 is greater than the predetermined value to conserve delivery bandwidth at the expensive of image quality since less than the reference predetermined bandwidth is available for delivery of encoded video signal 1050 and more bandwidth should be conserved initially.

By predicting an appropriate initial value of λ 114 according to the frame size of source video signal 1040 and the delivery bandwidth of encoded video signal 1050, λ adjuster 116 prevents excessive bandwidth consumption and unnecessarily poor image quality in the encoding of the first several frames of source video signal 1040.

Inclusion of Video Signal Encoder in a Computer System

In general, video signal encoder 100 (FIG. 1) encodes motion video signals for transmission through a computer network such as computer network 904 (FIG. 9). Video signal encoder 100 executes within a server computer 902 as described more completely below and server computer 902 transmits the encoded motion video signal through computer network 904 for receipt and real-time decoding of the motion video signal by a client computer 906. For example, a user of client computer 906 can direct client computer 906 to request from server computer 902 a particular video stream. By decoding and displaying the received motion video stream in real-time, i.e., generally at the same rate as the motion video stream is received and while the motion video stream is being received, client computer 906 can display the requested motion video stream shortly after requested by the user. Another application requiring real-time decoding and display of received motion video streams is video conferencing.

Server computer 902 is shown in greater detail in FIG. 10. Server computer 902 includes a processor 1002 and memory 1004 which is coupled to processor 1002 through an interconnect 1006. Interconnect 1006 can be generally any interconnect mechanism for computer system components and can be, e.g., a bus, a crossbar, a mesh, a torus, or a hypercube. Processor 1002 fetches from memory 1004 computer instructions and executes the fetched computer instructions. In addition, processor 1002 can fetch computer instructions through computer network 904 through network access circuitry 1060 such as a modem or ethernet network access circuitry. Processor 1002 also reads data from and writes data to memory 1004 and sends data and control signals through interconnect 1006 to one or more computer display devices 1020 and receives data and control signals through interconnect 1006 from one or more computer user input devices 1030 in accordance with fetched and executed computer instructions.

Memory 1004 can include any type of computer memory and can include, without limitation, randomly accessible memory (RAM), read-only memory (ROM), and storage devices which include storage media such as magnetic and/or optical disks. Memory 1004 includes video signal encoder 100 which is all or part of a computer process which in turn executes within processor 1002 from memory 1004. A computer process is generally a collection of computer instructions and data which collectively define a task performed by server computer 902.

Each of computer display devices 1020 can be any type of computer display device including without limitation a printer, a cathode ray tube (CRT), a light-emitting diode (LED) display, or a liquid crystal display (LCD). Each of computer display devices 1020 receives from processor 1002 control signals and data and, in response to such control signals, displays the received data. Computer display devices 1020, and the control thereof by processor 1002, are conventional.

Each of user input devices 1030 can be any type of user input device including, without limitation, a keyboard, a numeric keypad, or a pointing device such as an electronic mouse, trackball, lightpen, touch-sensitive pad, digitizing tablet, thumb wheels, or joystick. Each of user input devices generates signals in response to physical manipulation by a user and transmits those signals through interconnect 1006 to processor 1002.

Server computer 902 also includes video signal acquisition circuitry 1070 which can be, for example, a video camera and video image capture circuitry. Images captured by video image acquisition circuitry 1070 are stored in a buffer in memory 1004 as source video image 1040. Alternatively, motion video images can be captured separately, i.e., by another computer system, and stored in memory 1004 as source video signal 1040 for encoding and delivery to client computer 906 upon request. In addition, source video signal 1040 can be generated by processing of processor 1002 or by another computer and stored in memory 1004. Computer generated motion video images can be created, for example, by processing 3-dimensional (or 2-dimensional) video models by server computer 902 according to control signals generated by a user by physical manipulation of one or more of user input devices 1030.

As described above, video signal encoder 100 executes within processor 1002 from memory 1004. Specifically, processor 1002 fetches computer instructions from video signal encoder 100 and executes those computer instructions. Processor 1002, in executing video signal encoder 100, reads frames from source video signal 1040, processes and encodes those frames in the manner described above, and stores the encoded frames in encoded video signal 1050 or can transmit the encoded frames immediately through computer network 904 to client computer 906 (FIG. 9) which is shown in greater detail in FIG. 11.

Client computer 906 includes a processor 1102, memory 1104, interconnect 1106, computer display devices 1120, user input devices 1130, and network access circuitry 1160, which are analogous to processor 1002 (FIG. 10), memory 1004, interconnect 1006, computer display devices 1020, user input devices 1030, and network access circuitry 1060, respectively, of server computer 902. Video signal decoder 1100 (FIG. 11) is all or part of a computer process executing within processor 1102 from memory 1104. Video signal decoder 1100 receives encoded motion video signals from server computer 902 through computer network 904 and reconstructs frames of a motion video image from the encoded motion video signals, to thereby decode the encoded motion video signals, and displays the reconstructed frames on one or more of computer display devices 1120 for viewing by a user. The decoding and display of the motion video signals is conventional in one embodiment.

The above description is illustrative only and is not limiting. The present invention is limited only by the claims which follow.

What is claimed is:

1. A method for encoding a motion video signal, the method comprising:
   determining a desired size for a first frame of the motion video signal;
   encoding the first frame of the motion video signal to form an encoded frame;
   determining an encoded size of the encoded frame;
   comparing the encoded size to the desired size;
   adjusting an encoding parameter such that encoding the first frame according to the encoding parameter as adjusted would form a different encoded frame having a size closer to the desired size than the encoded size is to the desired size; and wherein the adjusting employs first and second adjustment mechanisms, the first adjustment mechanism comprising a pre-compensator and the second adjustment mechanism comprises a first encoding adjuster and a second encoding adjuster that is based at least in part on a damping factor which reduces overcorrection of the encoding parameter; and encoding a second frame of the motion video signal according to the encoding parameter as adjusted.

2. The method of claim 1 wherein the second frame is subsequent to the first frame in the motion video signal.

3. The method of claim 1 where in the encoding parameter is a numerical representation of a compromise between consumed bandwidth and image quality of the motion video signal as encoded.

4. The method of claim 1 wherein the step of adjusting comprises:
   determining a difference between the encoded size and the desired size; and
   adjusting the encoding parameter by an amount which is proportional to the difference.

5. A computer readable medium comprising instructions which, when executed by a computer, performs the method of claim 1.

6. A computer readable medium useful in association with a computer which includes a processor and a memory, the computer readable medium having computer instructions stored thereon which are configured to cause the computer to encode a motion video signal by performing the steps of:
   determining a desired size for a first frame of the motion video signal;
   encoding the first frame of the motion video signal to form an encoded frame;
   determining an encoded size of the encoded frame;
   comparing the encoded size to the desired size;
   adjusting an encoding parameter such that encoding the first frame according to the encoding parameter as adjusted would form a different encoded frame having a size closer to the desired size than the encoded size is to the desired size; and wherein the adjusting employs first and second adjustment mechanisms, the first adjustment mechanism comprising a pre-compensator and the second adjustment mechanism comprises a first encoding adjuster and a second encoding adjuster that is based at least in part on a damping factor which reduces overcorrection of the encoding parameter; and
   encoding a second frame of the motion video signal according to the encoding parameter as adjusted.

7. The computer readable medium of claim 6 wherein the second frame is subsequent to the first frame in the motion video signal.

8. The computer readable medium of claim 6 where the encoding parameter is a numerical representation of a compromise between consumed bandwidth and image quality of the motion video signal as encoded.

9. The computer readable medium of claim 6 wherein step of adjusting comprises:
   determining a difference between the encoded size and the desired size; and
   adjusting the encoding parameter by an amount which is proportional to the difference.

10. A computer system comprising:
    a processor;
    a memory operatively coupled to the processor; and
    a motion video signal encoder which executes in the processor from the memory and which, when executed by the processor, causes the computer to encode a motion video signal by performing the steps of:
       determining a desired size for a first frame of the motion video signal;
       encoding the first frame of the motion video signal to form an encoded frame;
       determining an encoded size of the encoded frame;
       comparing the encoded size to the desired size;
       adjusting an encoding parameter such that encoding the first frame according to the encoding parameter as adjusted would form a different encoded frame having a size closer to the desired size than the encoded size is to the desired size; and wherein the adjusting employs first and second adjustment mechanisms, the first adjustment mechanism comprising a pre-compensator and the second adjustment mechanism comprises a first encoding adjuster and a second encoding adjuster that is based at least in part on a damping factor which reduces overcorrection of the encoding parameter; and
       encoding a second frame of the motion video signal according to the encoding parameter as adjusted.

11. The computer system of claim 10 wherein the second frame is subsequent to the first frame in the motion video signal.

12. The computer system of claim 10 where in the encoding parameter is a numerical representation of a compromise between consumed bandwidth and image quality of the motion video signal as encoded.

13. The computer system of claim 10 wherein the step of adjusting comprises:
    determining a difference between the encoded size and the desired size; and
    adjusting the encoding parameter by an amount which is proportional to the difference.

14. A method, comprising:
    determining a desired size for a first frame of a motion video signal;
    encoding the first frame of the motion video signal to form an encoded frame;
    determining an encoded size of the encoded frame;
    comparing the encoded size to the desired size;
    adjusting an encoding parameter such that encoding the first frame according to the encoding parameter as adjusted would form a different encoded frame having a size closer to the desired size than the encoded size is to the desired size, and wherein the adjusting employs first and second adjustment mechanisms, the first adjustment mechanism comprising a pre-compensator and the second adjustment mechanism comprising a first encoding adjuster and a second different encoding adjuster; and
    encoding a second frame of the motion video signal according to the encoding parameter as adjusted.

15. The method of claim 14, wherein the pre-compensator is operable to adjust the encoding parameter based on a degree of change between the first frame and the second frame, and the first encoding adjuster comprises a primary open loop rate control adjuster and the second encoding adjuster comprises a secondary closed loop rate control adjuster, and wherein a higher weight is given to the secondary closed loop rate control adjuster.

16. The method of claim 15, wherein the degree of change comprises an absolute pixel difference between the first and second frames.

* * * * *